(12) United States Patent
Nomura

(10) Patent No.: US 12,524,111 B2
(45) Date of Patent: Jan. 13, 2026

(54) POSITION DETECTION CIRCUIT, POSITION DETECTION METHOD, AND POSITION DETECTION SYSTEM

(71) Applicant: Wacom Co., Ltd., Saitama (JP)

(72) Inventor: Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/001,174

(22) Filed: Dec. 24, 2024

(65) Prior Publication Data

US 2025/0130666 A1   Apr. 24, 2025

Related U.S. Application Data

(63) Continuation of application No. 18/596,481, filed on Mar. 5, 2024, now Pat. No. 12,216,863, which is a continuation of application No. 18/334,169, filed on Jun. 13, 2023, now Pat. No. 11,954,284.

(30) Foreign Application Priority Data

Jun. 15, 2022 (JP) .................................. 2022-096733

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
None
See application file for complete search history.

(56) References Cited

U.S. PATENT DOCUMENTS

| 2015/0002425 | A1* | 1/2015 | Lee ........................ | G06F 3/0416 |
| | | | | 345/173 |
| 2016/0048224 | A1* | 2/2016 | Brunet .................. | G06F 3/0442 |
| | | | | 345/174 |
| 2021/0081069 | A1* | 3/2021 | Bruwer ................... | G06F 3/038 |
| 2023/0152931 | A1* | 5/2023 | Nomura ................ | G06F 3/0442 |
| | | | | 345/173 |
| 2023/0409143 | A1* | 12/2023 | Nomura ................ | G06F 3/0446 |

FOREIGN PATENT DOCUMENTS

JP            6082172 B1      2/2017

\* cited by examiner

*Primary Examiner* — Stephen T. Reed
(74) *Attorney, Agent, or Firm* — Seed Intellectual Property Law Group LLP

(57) ABSTRACT

Provided is a position detection circuit that uses a touch sensor of a capacitance type including sensor electrodes to detect a first position indicated by a first indicator that communicates with the touch sensor to indicate the first position and a second position indicated by a second indicator that indicates the second position without communicating with the touch sensor, the position detection circuit including a first detection circuit that detects a touch of the second indicator to an input surface arranged on the touch sensor, a second detection circuit that detects the first indicator when proximity information indicating a proximity of the first indicator to the touch sensor is equal to or greater than a threshold, and a changing circuit that changes the threshold to a larger value when the first detection circuit detects the touch compared to when the first detection circuit does not detect the touch.

14 Claims, 14 Drawing Sheets

POSITION DETECTION CIRCUIT, POSITION DETECTION METHOD, AND POSITION DETECTION SYSTEM

BACKGROUND

Technical Field

The present disclosure relates to a position detection circuit, a position detection method, and a position detection system.

Description of the Related Art

Conventionally, there is known a position detection system that uses a touch sensor of capacitance type to detect a position indicated by a first indicator configured to communicate with the touch sensor to indicate the position and a position indicated by a second indicator configured to indicate the position without communicating with the touch sensor. For example, a position detection system is disclosed in Japanese Patent No. 6082172, the system being configured to use a touch sensor of capacitance type to detect a pen position that is a position indicated by an electronic pen of active capacitance type as the first indicator and a touch position that is a position indicated by a hand or finger of a user as the second indicator. In the position detection system, the pen position is detected when the touch sensor receives a downlink signal (pen signal) transmitted from the electronic pen through the communication with the touch sensor. The touch position is detected by detection of capacitive coupling between the hand or finger of the user and the touch sensor.

In the conventional position detection system that uses the touch sensor of capacitance type to detect the pen position and the touch position, the downlink signal from the electronic pen goes through the human body, and this causes a problem that the touch position is falsely detected as the pen position. For example, when the user holds the electronic pen to draw a picture or write a character, a side part or the like closer to the little finger of the hand holding the electronic pen may touch the input surface before the pen tip of the electronic pen touches the input surface. In such a case, the downlink signal from the electronic pen goes through the housing of the electronic pen and the human body. As a result, the downlink signal is transmitted to the touch position of the hand on the input surface and transmitted to the touch sensor at the touch position. As a result, the touch position of the hand on the input surface (the position indicated by the second indicator) is falsely detected as the pen position (the position indicated by the first indicator).

BRIEF SUMMARY

Embodiments of the present disclosure provide a position detection circuit, a position detection method, and a position detection system that can suppress false detection of a position indicated by a second indicator, as a position indicated by a first indicator.

A first aspect of the present disclosure provides a position detection circuit that uses a touch sensor of a capacitance type including a plurality of sensor electrodes to detect a position indicated by a first indicator that communicates with the touch sensor to indicate the position indicated by the first indicator and a position indicated by a second indicator that indicates the position indicated by the second indicator without communicating with the touch sensor, the position detection circuit including a first detection circuit that, in operation, detects a touch of the second indicator to an input surface arranged on the touch sensor, a second detection circuit that, in operation, detects the first indicator when proximity information indicating a proximity of the first indicator to the touch sensor is equal to or greater than a threshold, and a changing circuit that, in operation, changes the threshold to a larger value in a case where the first detection circuit detects the touch, wherein the larger value is larger than a value of the threshold in a case where the first detection circuit does not detect the touch.

A second aspect of the present disclosure provides the position detection circuit, in which the proximity information is a reception strength at the touch sensor of a downlink signal transmitted from the first indicator.

A third aspect of the present disclosure provides the position detection circuit, in which the proximity information is an amount of change in capacitance generated by capacitive coupling of the first indicator and the touch sensor.

A fourth aspect of the present disclosure provides the position detection circuit, in which the changing circuit, in operation, changes the threshold according to a distance between the input surface and the touch sensor.

A fifth aspect of the present disclosure provides the position detection circuit, in which the changing circuit, in operation, does not change the threshold or changes the threshold in a direction of a pre-change value when predetermined conditions are satisfied.

A sixth aspect of the present disclosure provides the position detection circuit, in which a first one of the predetermined conditions is that the first indicator is detected by the second detection circuit.

A seventh aspect of the present disclosure provides the position detection circuit, in which a second one of the predetermined conditions is that the first indicator detected by the second detection circuit is in use.

An eighth aspect of the present disclosure provides the position detection circuit, in which a second one of the predetermined conditions is that the position indicated by the first indicator detected by the second detection circuit is out of a predetermined range including the position indicated by the second indicator for which the touch is detected by the first detection circuit.

A ninth aspect of the present disclosure provides the position detection circuit further including a reception circuit that, in operation, receives a designation of a detectable range on the touch sensor in which the first indicator not in contact with the input surface can be detected, according to a user input, in which the changing circuit, in operation, changes the threshold such that the first indicator is detected when a distance between the first indicator and the touch sensor is within the detectable range.

A tenth aspect of the present disclosure provides a position detection method of using a touch sensor of capacitance type including a plurality of sensor electrodes to detect a position indicated by a first indicator that communicates with the touch sensor to indicate the position indicated by the first indicator and a position indicated by a second indicator that indicates the position indicated by a second indicator without communicating with the touch sensor, the position detection method being performed by a position detection circuit connected to the touch sensor, and the position detection method including detecting a touch of the second indicator to an input surface arranged on the touch sensor, detecting the first indicator when proximity information indicating a proximity of the first indicator to the touch sensor is equal to or greater than a threshold, and changing the threshold to a large value in a case where the touch is detected in the first detection, wherein the larger value is larger than a value of the threshold in a case where the touch is not detected in the first detection step.

An eleventh aspect of the present disclosure provides the position detection method, in which the proximity information is a reception strength at the touch sensor of a downlink signal transmitted from the first indicator.

A twelfth aspect of the present disclosure provides the position detection method, in which the proximity information is an amount of change in capacitance generated by capacitive coupling of the first indicator and the touch sensor.

A thirteenth aspect of the present disclosure provides the position detection method, in which the threshold is changed according to a distance between the input surface and the touch sensor.

A fourteenth aspect of the present disclosure provides the position detection method, in which the threshold is not changed or the threshold is changed in a direction of a pre-change value when predetermined conditions are satisfied.

A fifteenth aspect of the present disclosure provides the position detection method, in which a first one of the predetermined conditions is that the first indicator is detected.

A sixteenth aspect of the present disclosure provides the position detection method, in which a second one of the predetermined conditions is that the first indicator detected is in use.

A seventeenth aspect of the present disclosure provides the position detection method, in which a second one of the predetermined conditions is that the position indicated by the first indicator is out of a predetermined range including the position indicated by the second indicator for which the touch is detected.

An eighteenth aspect of the present disclosure provides the position detection method further including receiving a designation of a detectable range on the touch sensor in which the first indicator not in contact with the input surface can be detected, according to a user input, in which the threshold is changed such that the first indicator is detected when a distance between the first indicator and the touch sensor is within the detectable range.

A nineteenth aspect of the present disclosure provides a position detection system including a first indicator that, in operation, communicates with a touch sensor of a capacitance type including a plurality of sensor electrodes to indicate a position indicated by the first indicator, and a position detection circuit that, in operation, uses the touch sensor to detect the position indicated by the first indicator and a position indicated by a second indicator that, in operation, indicates the position indicated by a second indicator without communicating with the touch sensor, the position detection circuit including a first detection circuit that, in operation, detects a touch of the second indicator to an input surface arranged on the touch sensor, a second detection circuit that, in operation, detects the first indicator when proximity information indicating a proximity of the first indicator to the touch sensor is equal to or greater than a threshold, and a changing circuit that, in operation, changes the threshold to a large value in a case where the first detection circuit detects the touch, wherein the larger value is larger than a value of the threshold in a case where the first detection circuit does not detect the touch.

According to the present disclosure, falsely detecting the position indicated by the second indicator, as the position indicated by the first indicator, can be suppressed.

DETAILED DESCRIPTION

Figure 1:
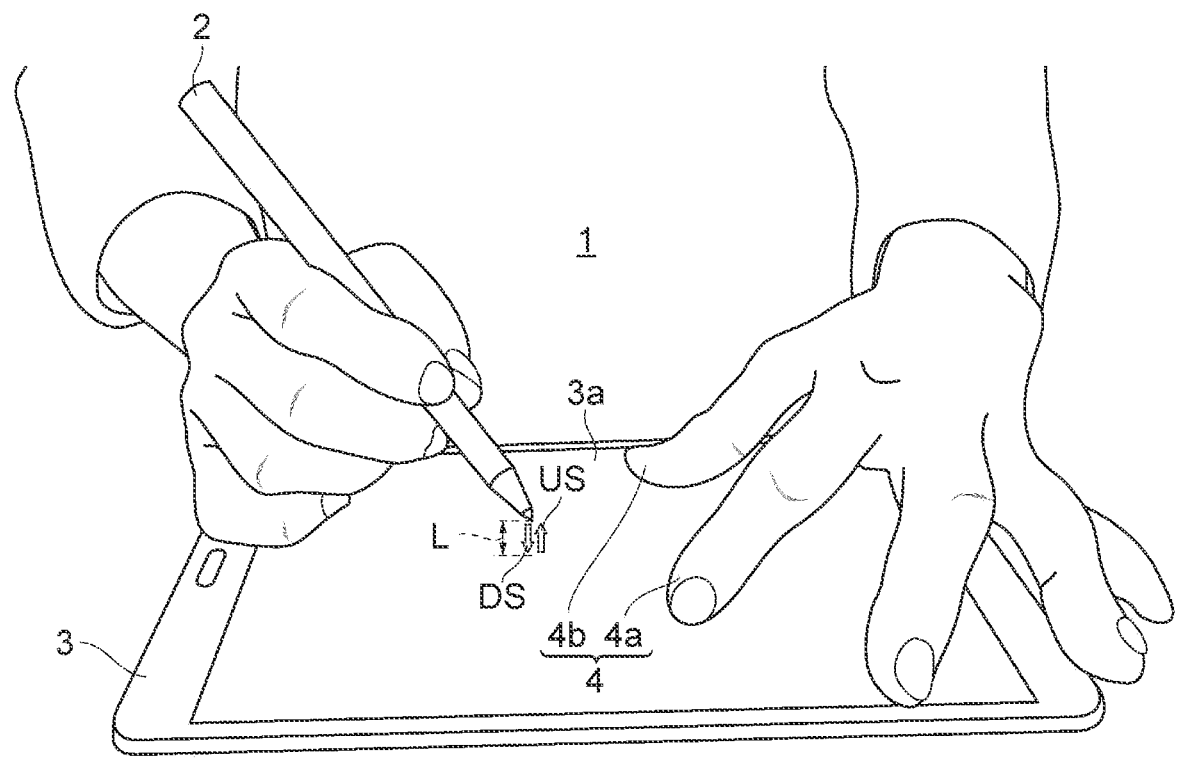
FIG. 1 depicts an example of an overall configuration and a use state of a position detection system according to a first embodiment of the present disclosure.

A position detection system according to various embodiments of the present disclosure will now be described with reference to the attached drawings. To facilitate the understanding of the description, the same reference signs are provided as much as possible to the same elements or the same functions in the drawings, and the description will not be repeated.

First Embodiment

Overall Configuration

FIG. 1 depicts an example of an overall configuration and a use state of a position detection system 1 according to a first embodiment of the present disclosure. As illustrated in FIG. 1, the position detection system 1 includes an electronic pen 2 and an electronic device 3.

The electronic pen 2 is an electronic pen operated by an active electrostatic system (AES), and is also called a "stylus." The electronic pen 2 can transmit and receive signals to and from the electronic device 3. Although not illustrated, a control circuit and a transmission and reception circuit are provided inside the electronic pen 2, and the control circuit can transmit and receive signals to and from the electronic device 3 through the transmission and reception circuit. In the following description, a signal transmitted from the electronic device 3 to the electronic pen 2 will be referred to as an uplink signal US, and a signal (pen signal) transmitted from the electronic pen 2 to the electronic device 3 will be referred to as a downlink signal DS.

Pen electrodes are provided on the front-end part of the electronic pen 2, and the transmission and reception circuit of the electronic pen 2 receives the uplink signal US and transmits the downlink signal DS through the capacitance formed between the pen electrodes and a touch sensor 18 (see FIG. 2) provided in an input surface 3a of the electronic device 3. Note that the pen electrodes for receiving the uplink signal and the pen electrodes for transmitting the downlink signal may be different or may be the same.

The electronic pen 2 includes a pen pressure detection circuit, a side switch state detection circuit, a storage circuit, a power supply circuit, and the like. The pen pressure detection circuit is, for example, a pen pressure detection circuit including a variable capacitor. The pen pressure detection circuit detects, as a pen pressure, the pressure applied to the pen tip of the electronic pen 2. The side switch state detection circuit is, for example, a switch operation circuit and a side switch provided on the side surface of the electronic pen 2. The side switch state detection circuit detects switch data indicating the on-off state of the side switch, according to whether or not the user has operated the switch operation circuit. The storage circuit is, for example, a non-volatile memory including a semiconductor memory. The storage circuit stores various programs necessary for executing processes, a unique pen identification (ID) allocated in advance, and the like. The power supply circuit is, for example, a battery that is a secondary battery including an accumulator, and supplies an operation power source of the electronic pen 2. The control circuit of the electronic pen 2 controls these circuits.

The electronic device 3 is, for example, a tablet terminal including the input surface 3a including a touch panel display. The electronic device 3 has a function of a display apparatus and a function of a position detection apparatus that detects the position indicated by an indicator on the input surface 3a. The electronic device 3 can detect a pen position that is a position indicated by the electronic pen 2 on the input surface 3a and a touch position that is a position indicated by a hand or finger 4 of the user on the input surface 3a.

The electronic pen 2 is a first indicator that communicates with the touch sensor 18 to indicate the position. The hand or finger 4 of the user is a second indicator that indicates the position without communicating with the touch sensor 18. Note that the second indicator is not limited to the hand or finger 4. The second indicator may be any conductor similar to the hand or finger 4 that can indicate the position without transmitting a signal, and may be an auxiliary device, such as a ruler and a passive pen. The electronic device 3 is not limited to the tablet terminal, and may be, for example, a smartphone or a personal computer.

The user can hold the electronic pen 2 with one hand and move the electronic pen 2 while pressing the pen tip of the electronic pen 2 against the input surface 3a of the electronic device 3 to draw a picture or write a character on the electronic device 3. The user can also bring his/her hand or finger 4 into contact with the input surface 3a to perform a desirable operation, such as an input operation of drawing a picture or writing a character on the electronic device 3 and a pinch-out operation.

FIG. 1 illustrates a state in which the user holds the electronic pen 2 with one hand and uses fingers 4a and 4b of the other hand to perform the pinch-out operation. Such a situation may occur when, for example, an input field displayed on the screen is enlarged by the pinch-out operation, and then the electronic pen 2 is used to make an input in the input field. As illustrated in FIG. 1, a distance L between the pen tip of the electronic pen 2 and the input surface 3a (to be exact, the touch sensor 18 described later) needs to be at least shorter than the maximum reach of the downlink signal DS in order to detect the electronic pen 2 when the pen tip of the electronic pen 2 is separated a little from the input surface 3a.

Figure 2:
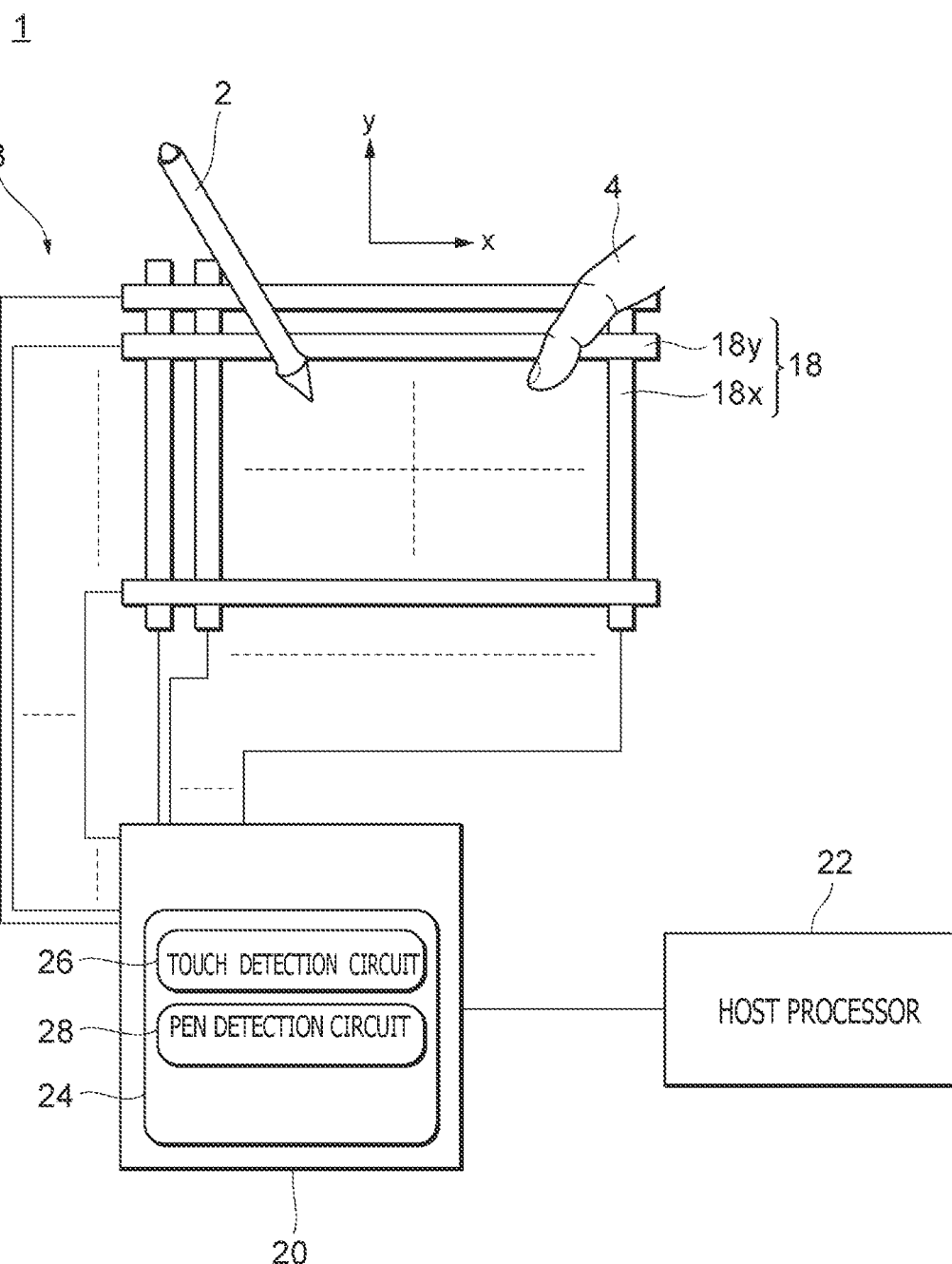
FIG. 2 depicts a schematic configuration of an electronic device of FIG. 1.

FIG. 2 depicts a schematic configuration of the electronic device 3 of FIG. 1. As illustrated in FIG. 2, the electronic device 3 includes the touch sensor 18, a touch IC 20 that is a position detection circuit, and a host processor 22. Although not illustrated in FIG. 2, the input surface 3a is arranged on the touch sensor 18.

The touch sensor 18 is a touch sensor of capacitance type including a plurality of sensor electrodes 18x and 18y arranged in a plane shape inside the input surface 3a. The sensor electrodes 18x detect the position on an X-axis, and the sensor electrodes 18y detect the position on a Y-axis. An x-direction and a y-direction illustrated in FIG. 2 correspond to the X-axis and the Y-axis of the Cartesian coordinate system defined on the input surface 3a.

The band-shaped sensor electrodes 18x are extended in the y-direction and arranged at equal intervals along the x-direction. The band-shaped sensor electrodes 18y are extended in the x-direction and arranged at equal intervals along the y-direction. Note that the touch sensor 18 may be a sensor of self-capacitance type including block-shaped electrodes arranged in a two-dimensional grid, instead of the sensor of mutual capacitance type.

Figure 3:
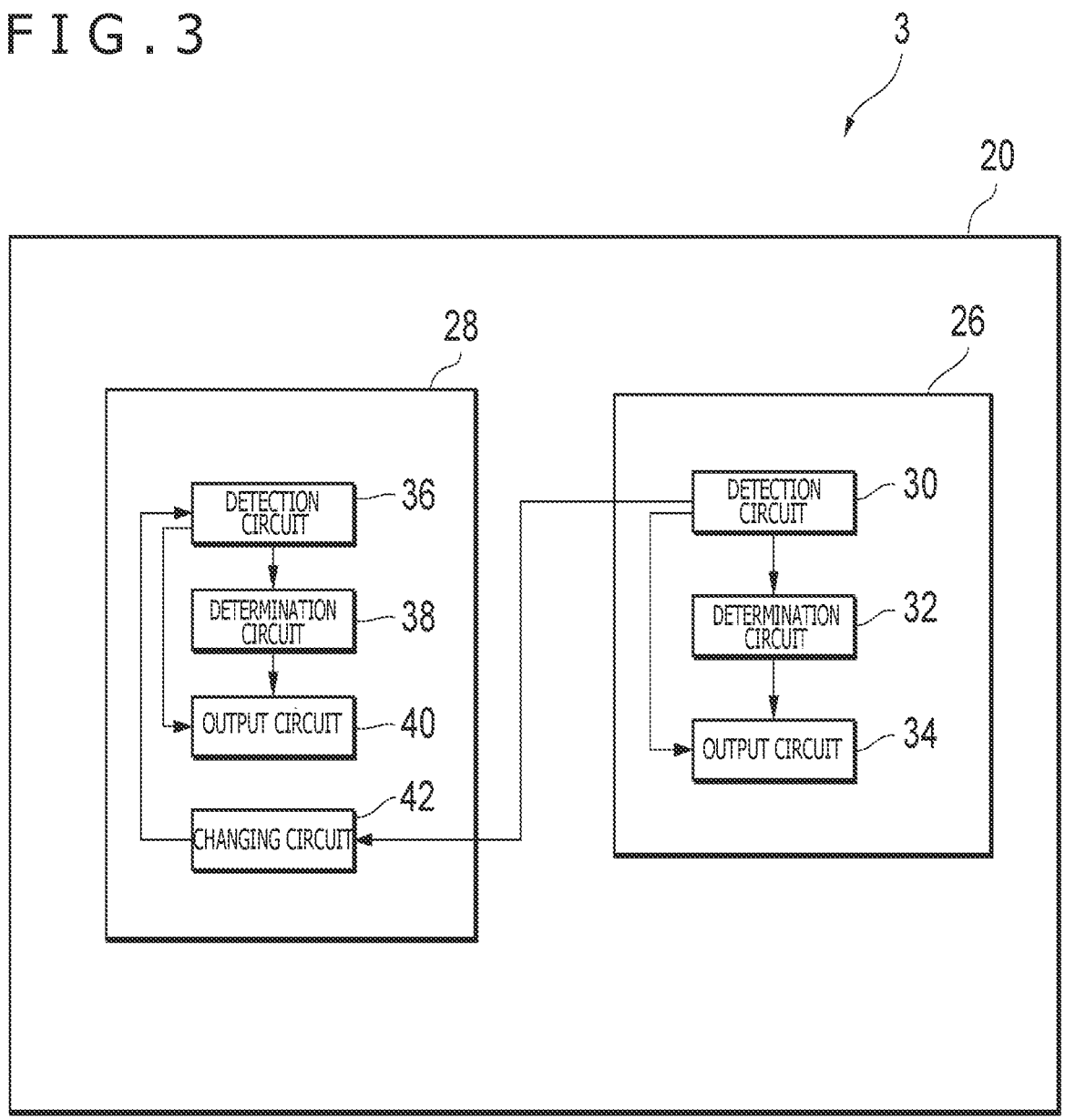
FIG. 3 is a functional block diagram illustrating functional components included in a touch integrated circuit (IC) of FIG. 2.

The touch IC 20 is connected to each of the plurality of sensor electrodes 18x and 18y included in the touch sensor 18. The touch IC 20 includes memories (read only memory (ROM) and random access memory (RAM)) inside, and is an integrated circuit that can execute firmware 24 stored in the memories. Functional components of the touch IC 20 described later with reference to FIG. 3 are realized by the firmware 24 being executed to operate the components of the touch IC 20.

The touch IC 20 can execute the firmware 24 to realize a touch detection function of detecting the touch position of the hand or finger 4 of the user on the input surface 3a and a pen detection function of detecting the pen position of the electronic pen 2 on the input surface 3a. In other words, the touch IC 20 includes a touch detection circuit 26 that performs the touch detection function and a pen detection circuit 28 that performs the pen detection function. The touch IC 20 outputs data acquired by the touch detection circuit 26 or the pen detection circuit 28 to the host processor 22.

Although not depicted, the touch IC 20 includes an operation control circuit that switches the operation mode in the position detection system 1. That is, the touch IC 20 can execute the firmware 24 to realize the function of the operation control circuit. Examples of the operation mode include a time-series mode of detecting the touch position of the hand or finger 4 and the pen position of the electronic pen 2 in time series and an exclusive mode of detecting the pen position of the electronic pen 2 but not the touch position of the hand or finger 4. For example, the operation control circuit sets the operation mode to the time-series mode when the electronic pen 2 is not detected and sets the operation mode to the exclusive mode when the electronic pen 2 is detected.

The host processor 22 is a processor including a central processing circuit (CPU) or a graphics processing circuit (GPU). The host processor 22 reads programs stored in an unillustrated memory and executes the programs to execute various applications, such as an operating system of the electronic device 3 and drawing software. The drawing software executes, for example, a process of generating stroke data in reference to such data as coordinates sequentially supplied from the touch IC 20 and rendering and displaying the stroke data on the display.

Functional Components of Touch IC 20

FIG. 3 is a functional block diagram illustrating functional components included in the touch IC 20 of FIG. 2.

Touch Detection Circuit 26

As illustrated in FIG. 3, the touch detection circuit 26 of the touch IC 20 includes a detection circuit 30 (first detection circuit), a determination circuit 32, and an output circuit 34.

The detection circuit 30 detects the capacitive coupling between the hand or finger 4 of the user and the sensor electrodes 18$x$ and 18$y$ to detect a touch of the hand or finger 4 to the input surface 3$a$. In other words, the detection circuit 30 detects the touch of the hand or finger 4 to the input surface 3$a$ according to the amount of change in the capacitance generated between the sensor electrodes 18$x$ and 18$y$ when the hand or finger 4 approaches the input surface 3$a$. Specifically, the detection circuit 30 transmits a touch detection signal to each sensor electrode 18$y$, and each sensor electrode 18$x$ receives the touch detection signal. The detection circuit 30 creates a heat map representing the detection level of the touch detection signal at each cross point (two-dimensional position) of the sensor electrodes 18$x$ and the sensor electrodes 18$y$ according to the reception result of the touch detection signal.

The sensor electrodes 18$x$ and the sensor electrodes 18$y$ are coupled through predetermined capacitance, and a touch detection signal in a predetermined detection level is detected from the sensor electrodes 18$x$ when the hand or finger 4 is not close to the input surface 3$a$. When the hand or finger 4 approaches the input surface 3$a$, the approaching hand or finger 4 and the sensor electrodes 18$x$ and 18$y$ forming the cross points near the hand or finger 4 are coupled through the capacitance, and part of the current flowing through the sensor electrodes 18$x$ flows toward the hand or finger 4. This changes the detection level (amplitude) of the touch detection signal detected from the sensor electrodes 18$x$. As a result, the change in the capacitance formed between the sensor electrodes 18$x$ and 18$y$ forming the cross points is reflected on the detection level of the touch detection signal.

The detection circuit 30 detects the touch of the hand or finger 4 to the input surface 3$a$ when there is a region in the input surface 3$a$ in which the amount of change in the capacitance formed between the sensor electrodes 18$x$ and 18$y$ forming the cross points is equal to or greater than a threshold, in reference to the created heat map (detection level of touch detection signal). The region in the input surface 3$a$ in which the amount of change in the capacitance is equal to or greater than the threshold will be referred to as a "touch region."

The detection circuit 30 detects, for example, the center position of the touch region as the touch position and calculates touch coordinates representing the coordinates of the touch position. Note that the detection circuit 30 may detect, as the touch position, the position with the maximum amount of change in the capacitance in the touch region or may detect the center of gravity of the touch region as the touch position. Note that when there is a plurality of touch regions separated from each other at certain intervals, the detection circuit 30 may detect a plurality of touch positions according to the touch regions. The detection circuit 30 outputs information based on the detection result (such as information indicating whether or not the touch is detected, the heat map, and the touch coordinates) to the determination circuit 32, the output circuit 34, and a changing circuit 42 of the pen detection circuit 28 described later.

The determination circuit 32 executes a determination process regarding the size of the touch region detected by the detection circuit 30. The determination circuit 32 determines whether or not the size of the touch region is within a reference range. The determination circuit 32 may use the area of the touch region to determine the size of the touch region or may use the number of cross points included in the touch region in addition to or in place of the area to determine the size of the touch region. The determination circuit 32 may use a plurality of reference ranges for determining the size of the touch region, instead of one reference range. For example, the determination circuit 32 may use a first range indicated by a lower limit and an upper limit for determining that the touch region is a small region and a second range indicated by a lower limit and an upper limit for determining that the touch region is a large region. A condition other than the area or the number of cross points, such as a length in x-direction or y-direction, may be used to determine the size of the touch region. The determination circuit 32 outputs the determination result regarding the size of the touch region to the output circuit 34.

The output circuit 34 outputs, to the host processor 22, the touch position detected by the detection circuit 30, in reference to the determination result regarding the size of the touch region determined by the determination circuit 32. Output of the touch position means output of the information regarding the touch position, and is, for example, output of touch coordinates. Note that the information regarding the touch position is not limited to the position information such as the touch coordinates, and the information regarding the touch position may include such information as the pressure applied to the touch position.

When the determination circuit 32 determines that the size of the touch region is within the reference range, the touch detected by the detection circuit 30 is likely to be an intentional touch by the user. Hence, the output circuit 34 outputs the touch position to the host processor 22 in this case. On the other hand, when the determination circuit 32 determines that the size of the touch region exceeds the reference range, the touch is a touch by a palm or a fist of the user indicating a part wider than the finger 4, and the touch is likely to be a touch not intended for an operation. Hence, the output circuit 34 in this case does not output the touch position to the host processor 22 or output the touch position after invalidating the touch position. Outputting the touch position after invalidating the touch position means that the touch position is output to the host processor 22 after being invalidated to prevent the host processor 22 from drawing a picture or the like in reference to the touch position. A specific example of the method of outputting the touch position after invalidating the touch position includes outputting a flag indicative of invalidation to the host processor 22 along with the touch position.

Pen Detection Circuit 28

The pen detection circuit 28 of the touch IC 20 includes a detection circuit 36 (second detection circuit), a determination circuit 38, an output circuit 40, and the changing circuit 42.

The touch sensor 18 receives the downlink signal DS transmitted from the electronic pen 2 through communication with the touch sensor 18, and the detection circuit 36 detects the pen position. Specifically, the detection circuit 36 executes a process of generating the uplink signal US and inputting the uplink signal US to the sensor electrodes 18x and 18y to transmit the uplink signal US from the sensor electrodes 18x and 18y to the pen electrodes of the electronic pen 2. The pen electrodes of the electronic pen 2 transmit the downlink signals DS in response to the reception of the uplink signal US. The detection circuit 36 sequentially uses the sensor electrodes 18x and 18y as reception electrodes to detect the downlink signal DS transmitted from the electronic pen 2.

If the detection circuit 36 has not yet detected the electronic pen 2, the detection circuit 36 executes a global scan for detecting the position by the entire touch sensor 18 in order to detect the undetected electronic pen 2. In this case, the detection circuit 36 uses all of the sensor electrodes 18x and 18y included in the touch sensor 18, to receive the downlink signal DS. The downlink signal DS received by the sensor electrodes 18x and 18y in this case includes a position signal that is a burst signal with a predetermined frequency.

After detecting the electronic pen 2, the detection circuit 36 executes a local scan for detecting the position by part of the touch sensor 18. In this case, the detection circuit 36 uses only a predetermined number of sensor electrodes 18x and 18y positioned near the position detected last time among the sensor electrodes 18x and 18y included in the touch sensor 18, to receive the downlink signal DS. The downlink signal DS received by the sensor electrodes 18x and 18y in this case includes a position signal that is a burst signal with a predetermined frequency and various data signals. The data signals include, for example, the pen pressure value, the switch data, the pen ID, and other pen data.

The detection circuit 36 detects the electronic pen 2 when proximity information indicating the proximity of the electronic pen 2 to the touch sensor 18 (hereinafter, simply referred to as "proximity information of electronic pen 2") is equal to or greater than a threshold. The proximity indicates the degree of closeness of the electronic pen 2 to the touch sensor 18.

The proximity information of the electronic pen 2 is, for example, the reception strength in the touch sensor 18 (sensor electrodes 18x and 18y) of the downlink signal DS transmitted from the electronic pen 2 (pen electrodes). The closer the pen tip (pen electrodes) of the electronic pen 2 to the touch sensor 18, the larger the reception strength in the touch sensor 18 of the downlink signal DS transmitted from the electronic pen 2. Hence, it can be stated that the reception strength is the proximity information of the electronic pen 2.

The proximity information of the electronic pen 2 may be, for example, the amount of change in the capacitance generated by the capacitive coupling of the electronic pen 2 and the touch sensor 18. A predetermined capacitance is generated in the sensor electrodes 18x and 18y when neither the first indicator nor the second indicator is close to the input surface 3a (when nothing is on the sensor electrodes 18x and 18y). When the electronic pen 2 approaches the input surface 3a from this state with reference to the predetermined capacitance, the pen electrodes of the electronic pen 2 and the sensor electrodes 18x and 18y near the pen electrodes are coupled through the capacitance, and the capacitance in the sensor electrodes 18x and 18y changes with respect to the reference capacitance. The closer the pen electrodes of the electronic pen 2 to the sensor electrodes 18x and 18y, the larger the amount of change in the capacitance. Hence, it can be stated that the amount of change in the capacitance is the proximity information of the electronic pen 2.

The case in which the proximity information of the electronic pen 2 is the reception strength in the touch sensor 18 of the downlink signal DS transmitted from the electronic pen 2 will be described below. In this case, the detection circuit 36 detects the electronic pen 2 when the reception strength of the downlink signal DS in the sensor electrodes 18x and 18y is equal to or greater than a threshold. The detection circuit 36 does not detect the electronic pen 2 when the reception strength is smaller than the threshold.

The reception strength of the downlink signal DS in the sensor electrodes 18x and 18y is indicated by the detection level of the position signal in each of the sensor electrodes 18x and 18y (the amplitude of the potential of the sensor electrodes 18x and 18y used as the reception electrodes). The detection circuit 36 detects the electronic pen 2 when there is a region in the input surface 3a in which the detection level of the position signal in each of the sensor electrodes 18x and 18y is equal to or greater than a threshold. The region in the input surface 3a in which the detection level of the position signal in each of the sensor electrodes 18x and 18y is equal or greater than the threshold will hereinafter be referred to as a "pen region." The detection circuit 36 detects, for example, the center position of the pen region as the pen position and calculates the pen coordinates indicating the coordinates of the pen position. Note that the detection circuit 36 may detect, as the pen position, the position with the maximum detection level of the position signal in the pen region or may detect the center of gravity of the pen region as the pen position.

The detection circuit 36 decodes the data signal received in the local scan, to acquire the pen data transmitted from the electronic pen 2. The detection circuit 36 outputs the information based on the detection result (such as information indicating whether or not the pen is detected, the pen coordinates, and the pen data) to the determination circuit 38 and the output circuit 40. The detection circuit 36 also pairs with the electronic pen 2 when the electronic pen 2 is detected while the detection circuit 36 is not being paired with the electronic pen 2.

The determination circuit 38 determines the operation state of the electronic pen 2, such as pen-down, pen move, pen-up, and hover, in reference to the pen data transmitted from the electronic pen 2. The pen-down indicates that the pen tip of the electronic pen 2 is placed on the input surface 3a, that is, the electronic pen 2 is in contact with the input surface 3a. The pen move indicates that the electronic pen 2 in contact with the input surface 3a continues to be in contact with the input surface 3a. The pen-up indicates that the electronic pen 2 in contact with the input surface 3a is separated from the input surface 3a. The hover indicates that the detected electronic pen 2 is not in contact with the input surface 3a and is separated from the input surface 3a. The operation state is used by the host processor 22 to recognize the start and the end of the stroke.

The determination circuit 38 determines the operation state of the electronic pen 2 in reference to, for example, the pen pressure value of the electronic pen 2. The determination circuit 38 determines that the operation state is the pen-up when, for example, the pen pressure value changes from a value larger than 0 to 0. The determination circuit 38 may determine that the operation state is the pen-up not only when the pen pressure value changes to 0, but also when, for example, the pen pressure value changes to a value equal to or smaller than a threshold close to 0. The electronic pen 2 is about to be separated from the input surface 3a when the pen pressure value changes to a value equal to or smaller than the threshold close to 0, and the electronic pen 2 may be assumed to be separated from the input surface 3a even when the electronic pen 2 is not completely separated from the input surface 3a. The determination circuit 38 determines that the operation state is the pen-down when the pen pressure value changes from 0 to a value larger than 0. The determination circuit 38 determines that the operation state is the pen move when the pen pressure value maintains a value larger than 0. The determination circuit 38 determines that the operation state is the hover when the determination circuit 38 continues to detect the pen pressure value of 0. The determination circuit 38 outputs the determination result regarding the operation state of the electronic pen 2 to the output circuit 40.

The output circuit 40 outputs information based on the result of detection performed by the detection circuit 36 to the host processor 22. The output circuit 40 outputs information indicating that the pen is not detected to the host processor 22 when the reception strength of the downlink signal DS in the sensor electrodes 18x and 18y is smaller than the threshold. The output circuit 40 outputs the pen position to the host processor 22 when the reception strength of the downlink signal DS in the sensor electrodes 18x and 18y is equal to or greater than the threshold. Output of the pen position means output of information regarding the pen position, and for example, the pen coordinates calculated by the detection circuit 36, the pen data acquired by the detection circuit 36, and the information indicating the operation state of the electronic pen 2 are output.

Figure 4:
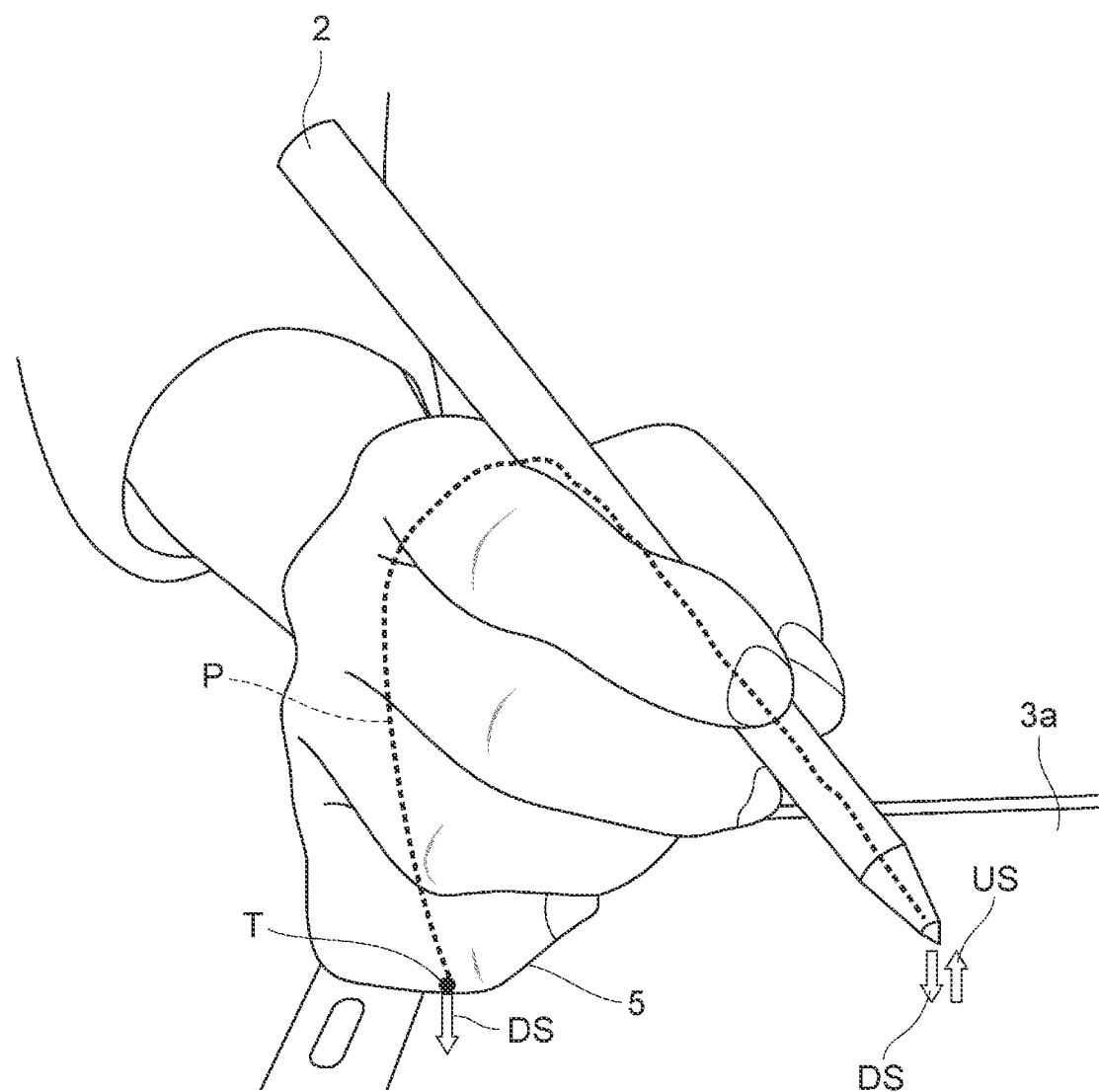
FIG. 4 is a diagram for describing an example of a case in which a downlink signal is transmitted at a touch position.

Incidentally, when the touch sensor 18 of capacitance type is used to detect the pen position and the touch position, as a result of the downlink signal DS going through the human body, the downlink signal DS may be transmitted toward the touch sensor 18 at the touch position instead of at the pen position. FIG. 4 is a diagram for describing an example of the case in which the downlink signal DS is transmitted at a touch position T.

As illustrated in FIG. 4, a side part 5 closer to the little finger of the hand holding the electronic pen 2 (hereinafter, simply referred to as the "side part 5 of hand") may touch the input surface 3a before the pen tip touches the input surface 3a when the electronic pen 2 is used to make an input to the input surface 3a. In this case, the downlink signal DS from the electronic pen 2 goes through the housing of the electronic pen 2 and the human body in a path P. As a result, the downlink signal DS is transmitted to the touch position T of the side part 5 of the hand on the input surface 3a, and the downlink signal DS is transmitted from the touch position T to the sensor electrodes 18x and 18y. That is, the downlink signal DS indicating a fake pen position is transmitted to the sensor electrodes 18x and 18y before the downlink signal DS indicating the true pen position is. In such a case, the conventional position detection system has a problem that the touch position T is falsely detected as the pen position according to the downlink signal DS transmitted at the touch position T.

There is also a problem that the downlink signal DS from the electronic pen 2 is similarly transmitted to the touch positions of the fingers 4a and 4b through the human body and the touch positions are falsely detected as the pen position when, for example, the fingers 4a and 4b of the hand opposite the hand holding the electronic pen 2 touch the input surface 3a while the electronic pen 2 is separated from the input surface 3a as illustrated in FIG. 1. In such a case, the exclusive mode in which the touch detection is not performed when the electronic pen 2 is detected can be used to suppress false detection of the touch position as the pen position. However, when, for example, the user uses the fingers 4a and 4b to perform the pinch-out operation while the pen tip is separated from the input surface 3a in the exclusive mode, there may be such an inconvenience that the pinch-out operation cannot appropriately be detected if the pen tip is very close to the input surface 3a.

As such, the changing circuit 42 of the pen detection circuit 28 changes the threshold of the proximity information for detecting the electronic pen 2 to a large value in a case where the detection circuit 30 detects the touch of the hand or finger 4 to the input surface 3a, compared to a case where the detection circuit 30 does not detect the touch. The threshold of the proximity information for detecting the electronic pen 2 will hereinafter be referred to as a "pen detection threshold." When, for example, the side part 5 of the hand touches the input surface 3a as illustrated in FIG. 4, the detection circuit 30 detects the touch and outputs information indicating the detection of the touch to the changing circuit 42. In this case, the changing circuit 42 changes the pen detection threshold to a value larger than the value set before the detection of the touch and thereby reduces the pen detection sensitivity in the pen detection to be executed next.

Figure 5A:
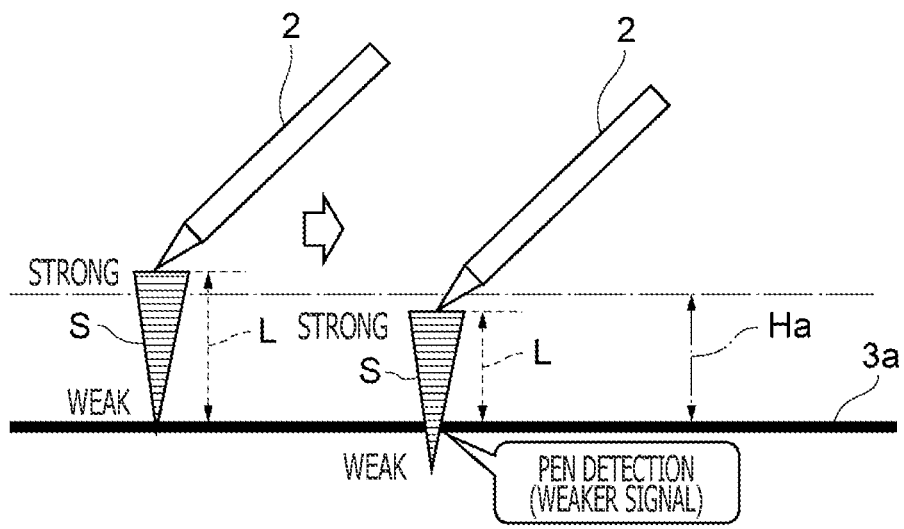
FIGS. 5A and 5B are diagrams for describing a difference between hover heights corresponding to pen detection thresholds.
Figure 5B:
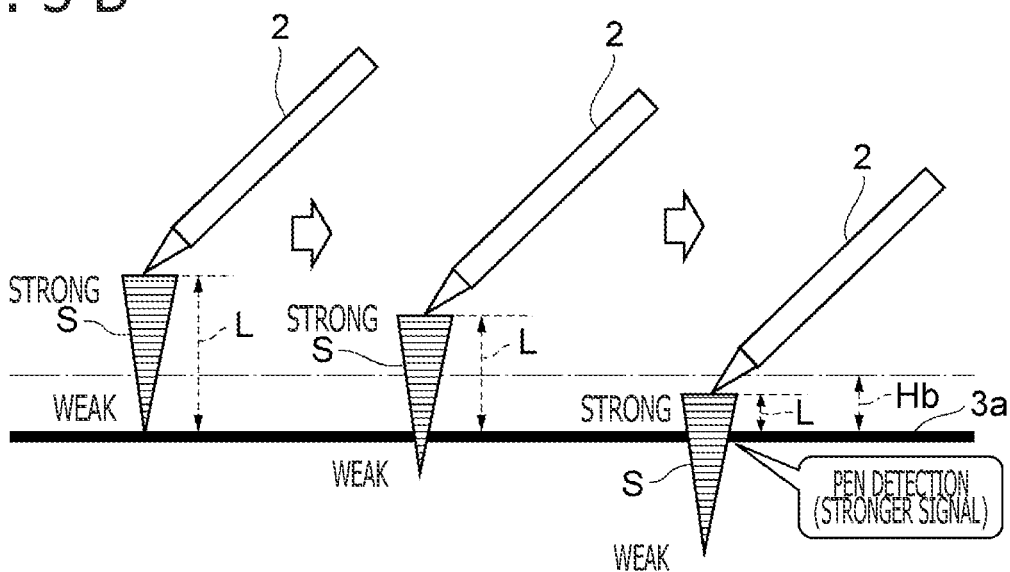

FIGS. 5A and 5B are diagrams for describing the difference between the hover heights corresponding to the pen detection thresholds. FIG. 5A illustrates a hover height Ha before the pen detection threshold is changed. FIG. 5B illustrates a hover height Hb after the pen detection threshold is changed. In the present embodiment, the "height" represents the distance in the cross direction (substantially orthogonal direction) with respect to the input surface 3a. Although the word "height" is used in the description for convenience, the direction of the distance is not limited to the vertical direction. Although the touch sensor 18 in the input surface 3a is not illustrated in FIGS. 5A and 5B, it is assumed that the height of the surface of the touch sensor 18 is substantially the same as the height of the input surface 3a in the description.

The hover heights Ha and Hb are heights of the electronic pen 2 that allow the operation state to be assumed to be the hover, and the heights Ha and Hb indicate detectable ranges on the touch sensor 18 in which the detection circuit 36 can detect the electronic pen 2 not in contact with the input surface 3a. The hover heights Ha and Hb are, for example, shortest distances between the pen tip (pen electrodes) of the electronic pen 2 and the touch sensor 18 (sensor electrodes 18x and 18y) when the electronic pen 2 is detected. Note that the height of the surface of the touch sensor 18 can be assumed to be substantially the same as the height of the input surface 3a in the example illustrated in FIGS. 5A and 5B, and the hover heights Ha and Hb are indicated as heights based on the input surface 3a.

FIGS. 5A and 5B schematically illustrate triangles representing strength S of the downlink signal DS transmitted from the pen tip of the electronic pen 2. The triangles indicate that the strength S is the strongest on the pen tip side (bottom side of triangle) that is the transmission side of the downlink signal DS, and the strength S decreases with an increase in the distance from the pen tip in the direction from the pen tip side to the touch sensor 18 side.

As illustrated in FIG. 5A, the pen detection threshold is set such that the electronic pen 2 is detected when the distance L between the pen tip of the electronic pen 2 and the touch sensor 18 is equal to or smaller than the hover height Ha before the pen detection threshold is changed. The hover height Ha is, for example, approximately 1 to 2 cm. The strength S of the downlink signal DS detected by the sensor electrodes 18x and 18y in the input surface 3a (the reception strength in the sensor electrodes 18x and 18y) in this case is weaker than the strength S after the change in the pen detection threshold described later. That is, the electronic pen 2 is detected even when the sensor electrodes 18x and 18y receive the downlink signal DS with relatively weak strength S, and the detection sensitivity of the electronic pen 2 is relatively high.

On the other hand, as illustrated in FIG. 5B, the pen detection threshold is changed such that the electronic pen 2 is detected when the distance L between the pen tip of the electronic pen 2 and the touch sensor 18 is equal to or smaller than the hover height Hb after the pen detection threshold is changed. The hover height Hb is, for example, approximately 0.5 mm which is shorter than the hover height Ha, and the electronic pen 2 is not detected unless the pen tip of the electronic pen 2 comes closer to the input surface 3a. The strength S of the downlink signal DS detected by the sensor electrodes 18x and 18y in the input surface 3a (the reception strength in the sensor electrodes 18x and 18y) in this case is stronger than that before the pen detection threshold is changed. That is, the electronic pen 2 is not detected unless the sensor electrodes 18x and 18y receive the downlink signal DS with relatively strong strength S, and the detection sensitivity of the electronic pen 2 is relatively low.

As described above, the pen detection sensitivity is reduced when the touch of the hand or finger 4 to the input surface 3a is detected, making it difficult for the sensor electrodes 18x and 18y to detect the downlink signal DS transmitted at the touch position T as illustrated in FIG. 4. This can suppress the problem of the conventional technique that the touch position T is falsely detected as the pen position.

The changing circuit 42 may change the pen detection threshold according to the distance between the input surface 3a and the touch sensor 18. The distance between the input surface 3a and the touch sensor 18 indicates, for example, the shortest distance between the input surface 3a and the surface of the sensor electrode 18x (or the sensor electrode 18y). For example, the changing circuit 42 changes the pen detection threshold such that the hover height varies according to the distance between the input surface 3a and the touch sensor 18.

Figure 6A:
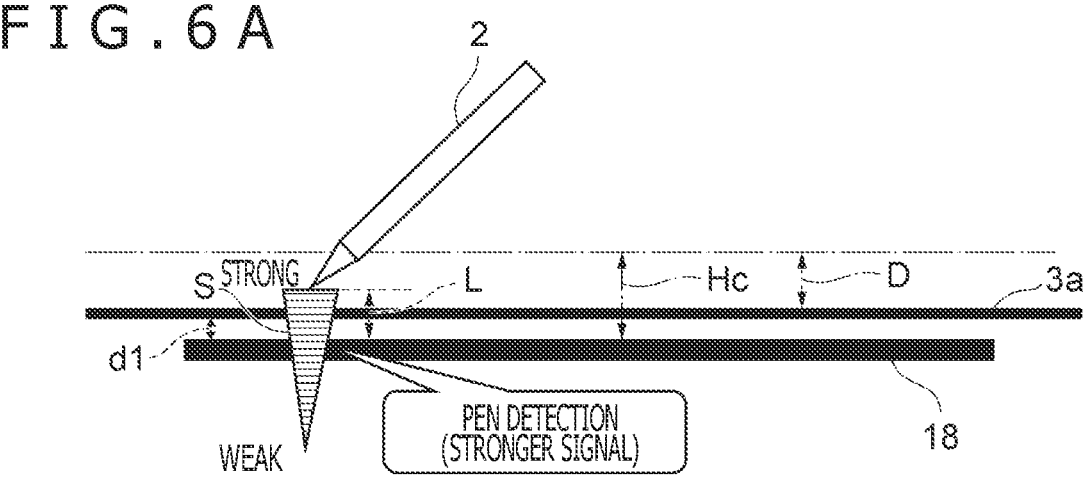
FIGS. 6A and 6B are diagrams for describing a specific example of changing the pen detection threshold according to the distance between an input surface and a touch sensor.
Figure 6B:
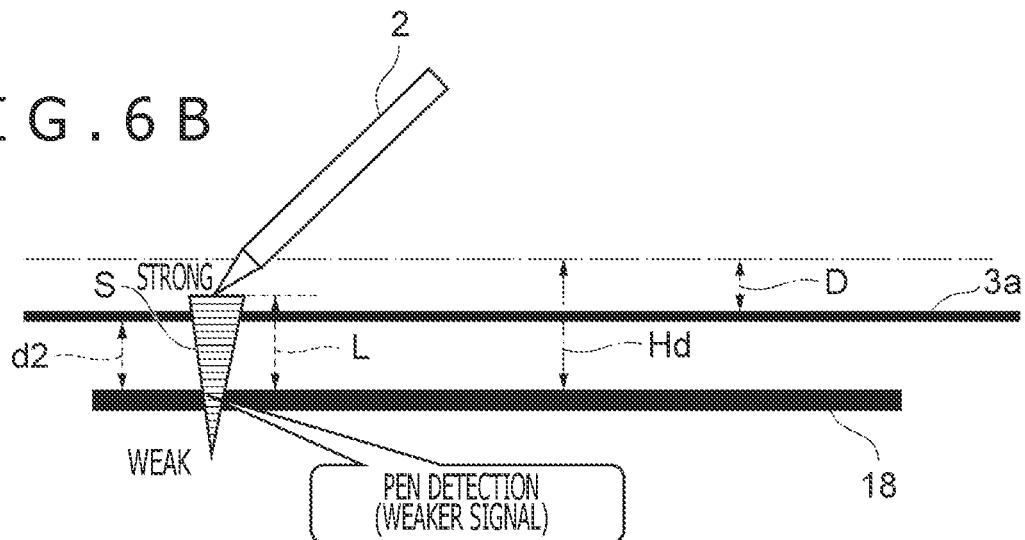

FIGS. 6A and 6B are diagrams for describing a specific example of changing the pen detection threshold according to distances d1 and d2 between the input surface 3a and the touch sensor 18. FIG. 6A illustrates a case in which the distance d1 between the input surface 3a and the touch sensor 18 is relatively short, and FIG. 6B illustrates a case in which the distance d2 between the input surface 3a and the touch sensor 18 is relatively long.

As illustrated in FIG. 6A, the pen detection threshold is set or changed such that the electronic pen 2 is detected when the distance L between the pen tip of the electronic pen 2 and the touch sensor 18 is equal to or smaller than a hover height Hc in the case of the distance d1. The hover height Hc is a short distance D from the input surface 3a. The strength S of the downlink signal DS detected by the sensor electrodes 18x and 18y in the input surface 3a (the reception strength in the sensor electrodes 18x and 18y) in this case is stronger than that in the case of the distance d2 described later. That is, the electronic pen 2 is not detected unless the sensor electrodes 18x and 18y receive the downlink signal DS with relatively strong strength S, and the detection sensitivity of the electronic pen 2 is relatively low.

On the other hand, as illustrated in FIG. 6B, the pen detection threshold is set or changed such that the electronic pen 2 is detected when the distance L between the pen tip of the electronic pen 2 and the touch sensor 18 is equal to or smaller than a hover height Hd in the case of the distance d2. The hover height Hd is a short distance D from the input surface 3a, and the hover height Hd is longer than the hover height Hc because the distance d2 is longer than the distance d1. The strength S of the downlink signal DS detected by the sensor electrodes 18x and 18y in the input surface 3a (the reception strength in the sensor electrodes 18x and 18y) in this case is relatively weak compared to the case of the distance d1. That is, the electronic pen 2 is detected even when the sensor electrodes 18x and 18y receive the downlink signal DS with the strength S weaker than that in the case of the distance d1, and the detection sensitivity of the electronic pen 2 is relatively high.

As described above, the pen detection threshold is changed in such a manner as to set different hover heights Hc and Hd according to the distances d1 and d2 between the input surface 3a and the touch sensor 18, and the electronic pen 2 is detected when the user brings the electronic pen 2 closer to the input surface 3a by the same short distance D even when the distances d1 and d2 are different. This can suppress the difference in the usability of the user based on the difference between the specifications of the electronic devices 3, such as different distances d1 and d2. Note that the changing circuit 42 may not only change the pen detection threshold according to the distances d1 and d2 in changing the pen detection threshold to a large value after the touch detection by the detection circuit 30, but may also change the pen detection threshold as an initial setting according to the distances d1 and d2 before the touch detection by the detection circuit 30, for example.

Operation of Position Detection System 1

Figure 7:
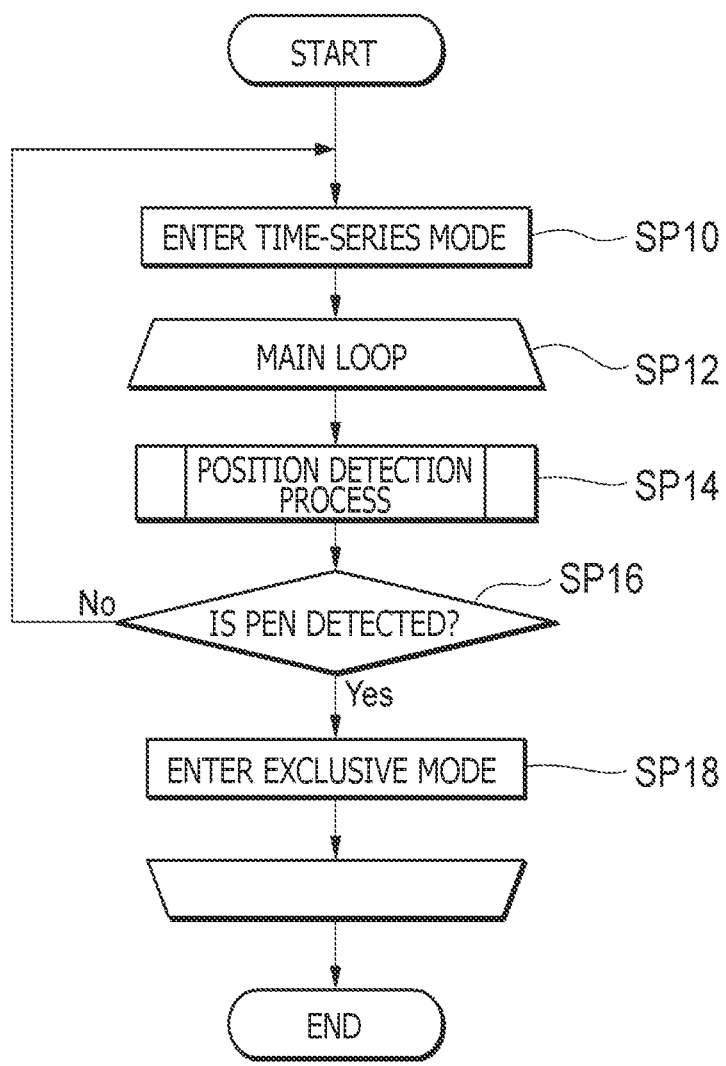
FIG. 7 is a flow chart illustrating an example of a flow of a position detection process in the position detection system according to the first embodiment.

A flow of the process of detecting the pen position and the touch position in the position detection system 1 will next be described with reference to FIG. 7. FIG. 7 is a flow chart illustrating an example of the flow of the position detection process in the position detection system 1.

(SP10)

First, the operation control circuit of the touch IC 20 enters the time-series mode. The process then moves to the process of SP12.

(SP12)

The operation control circuit of the touch IC 20 repetitively executes the process of SP14 to SP18 until a predetermined end condition is satisfied.

(SP14)

The touch IC 20 executes a position detection process. The details of the position detection process vary according to the operation mode entered by the operation control circuit of the touch IC 20. The details of the position detection process when the operation mode is the time-series mode will be described later with reference to FIG. 8. The details of the position detection process when the operation mode is the exclusive mode will be described later with reference to FIG. 9. The process then moves to the process of SP16.

(SP16)

The operation control circuit of the touch IC 20 determines whether or not the electronic pen 2 is detected in the position detection process of SP14. The operation control circuit of the touch IC 20 makes the determination according to whether or not the downlink signal DS equal to or greater than the pen detection threshold is received in the position detection process of SP14. The operation control circuit affirms the determination if the downlink signal DS equal to or greater than the pen detection threshold is received. The operation control circuit pairs with the electronic pen 2 when the operation control circuit is not paired with the electronic pen 2, and the process moves to the process of SP18. The operation control circuit negates the determination if the downlink signal DS equal to or greater than the pen detection threshold is not received. The operation control circuit cancels the pairing when the operation control circuit is paired with the electronic pen 2, and the process returns to the process of SP10.

(SP18)

The operation control circuit of the touch IC 20 enters the exclusive mode. The process then returns to the process of SP14.

The position detection process in each operation mode will next be described in detail with reference to FIGS. 8 and 9.

Figure 8:
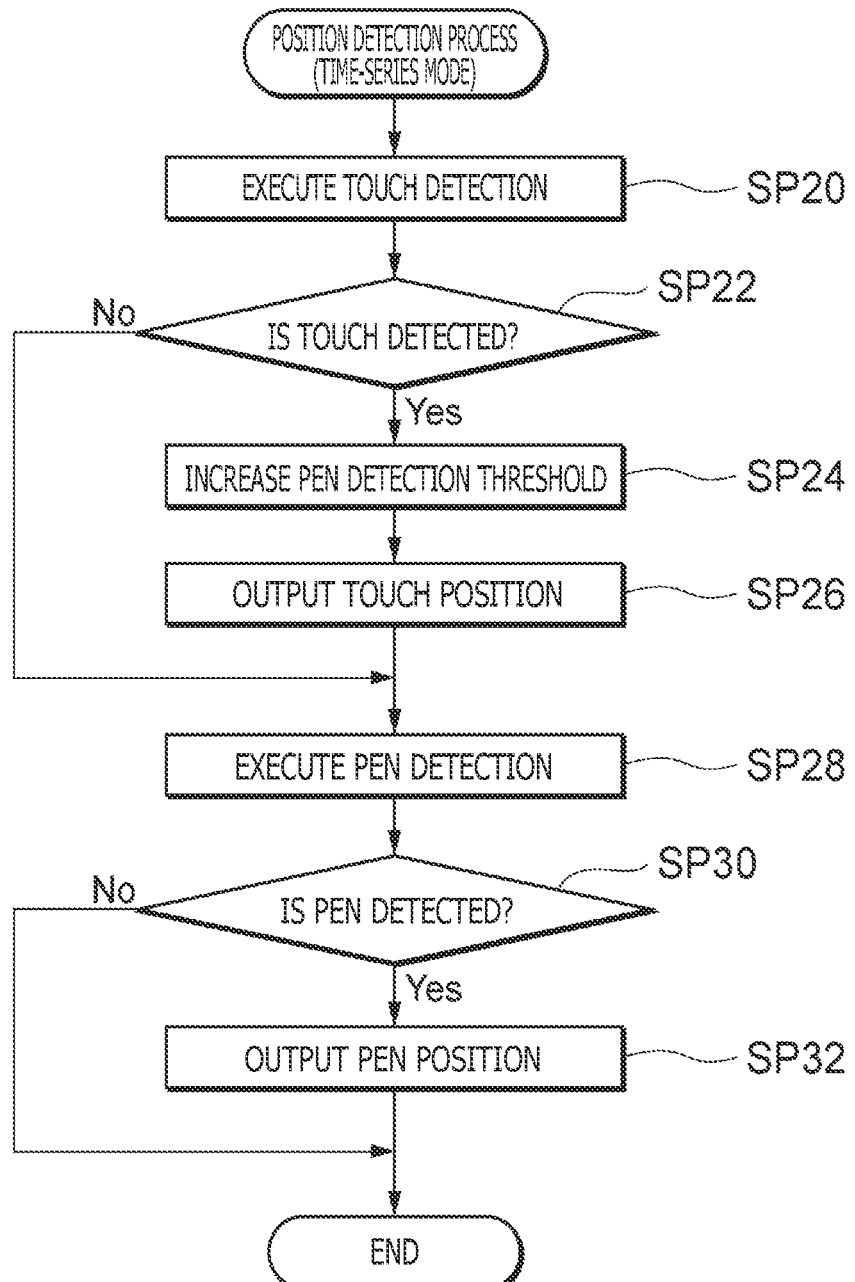
FIG. 8 is a flow chart illustrating an example of the flow of the position detection process in a time-series mode.

FIG. 8 is a flow chart illustrating an example of the flow of the position detection process in the time-series mode.

(SP20)

The detection circuit 30 in the touch IC 20 executes the touch detection of detecting the touch position. Specifically, the detection circuit 30 transmits the touch detection signal to each sensor electrode 18y, and each sensor electrode 18x receives the touch detection signal. The detection circuit 30 next creates the heat map representing the detection level of the touch detection signal at each cross point of the sensor electrodes 18x and the sensor electrodes 18y, according to the reception result of the touch detection signal. The process then moves to the process of SP22.

(SP22)

The detection circuit 30 determines whether or not the touch of the hand or finger 4 to the input surface 3a is detected. The detection circuit 30 makes the determination according to whether or not there is a touch region in which the amount of change in the capacitance formed between the sensor electrodes 18x and 18y forming the cross points is equal to or greater than the threshold in the heat map created in the process of SP20. The detection circuit 30 affirms the determination if there is a touch region, and the process moves to the process of SP24. On the other hand, the detection circuit 30 negates the determination if there is no touch region, and the process moves to the process of SP28.

(SP24)

The changing circuit 42 in the touch IC 20 changes the pen detection threshold to a large value. For example, the changing circuit 42 changes the pen detection threshold in such a manner as to change the hover height Ha to the hover height Hb. In this case, the changing circuit 42 may take into account the distances d1 and d2 between the input surface 3a and the touch sensor 18 to change the pen detection threshold in such a manner as to set the hover heights Hc and Hd corresponding to the distances d1 and d2. The process then moves to the process of SP26.

(SP26)

The detection circuit 30 detects, for example, the center position in the touch region detected in the process of SP22, as the touch position, and calculates the touch coordinates.

The determination circuit 32 of the touch IC 20 determines the size of the touch region detected in the process of SP22. The output circuit 34 of the touch IC 20 then outputs the information indicating the touch coordinates to the host processor 22 in reference to the result of determination made by the determination circuit 32. The process then moves to the process of SP28.

(SP28)

The detection circuit 36 in the touch IC 20 executes the pen detection of detecting the pen position. Specifically, the detection circuit 36 transmits the uplink signal US from the sensor electrodes 18x and 18y to the pen electrodes of the electronic pen 2, and the sensor electrodes 18x and 18y receive the downlink signal DS transmitted by the pen electrodes of the electronic pen 2 in response to the reception of the uplink signal US. In this way, the detection circuit 36 detects the detection level of the position signal in each of the sensor electrodes 18x and 18y. The process then moves to the process of SP30.

(SP30)

The detection circuit 36 determines whether or not the electronic pen 2 is detected. The detection circuit 36 makes the determination according to whether or not there is a pen region in which the detection level of the position signal in each of the sensor electrodes 18x and 18y detected in the process of SP28 is equal to or greater than the pen detection threshold. The detection circuit 36 affirms the determination if there is a pen region, and the process moves to the process of SP32. On the other hand, the detection circuit 36 negates the determination if there is no pen region, and the position detection process illustrated in FIG. 8 ends.

(SP32)

The detection circuit 36 detects, for example, the center position of the pen region detected in the process of SP30, as the pen position, and calculates the pen coordinates of the pen position. When the downlink signal DS includes the data signal, the detection circuit 36 decodes the data signal to acquire the pen data. The output circuit 40 of the touch IC 20 then outputs the information indicating the pen coordinates and the pen data to the host processor 22. This completes the position detection process illustrated in FIG. 8.

Figure 9:
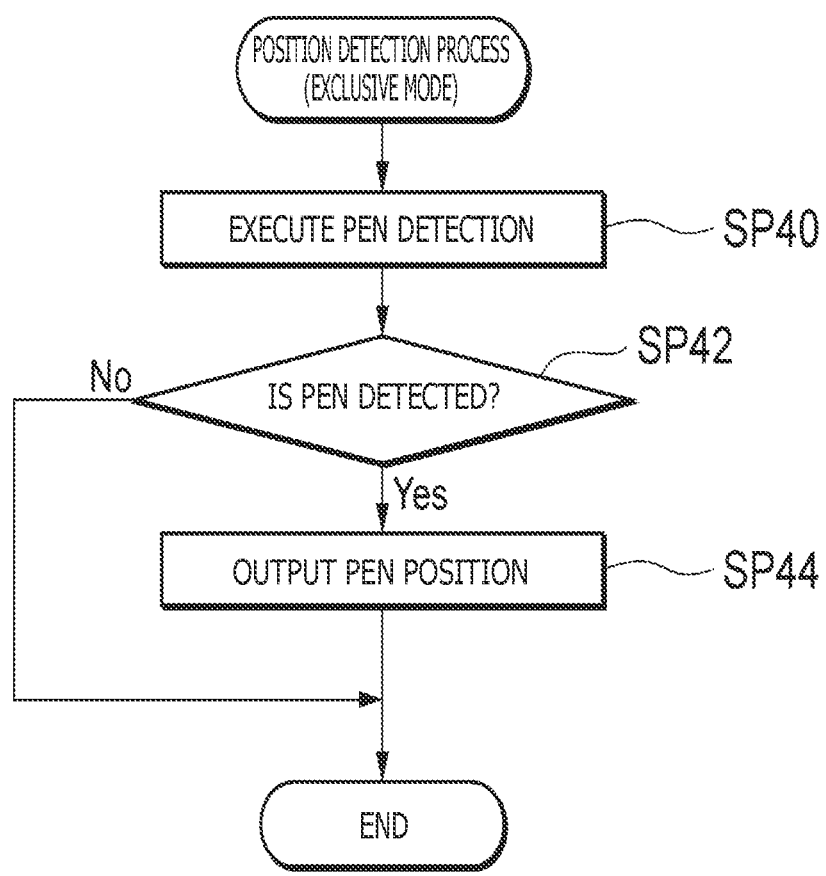
FIG. 9 is a flow chart illustrating an example of the flow of the position detection process in an exclusive mode.

FIG. 9 is a flow chart illustrating an example of the flow of the position detection process in the exclusive mode. In the exclusive mode, the detection circuit 30 does not execute the touch detection process, and the detection circuit 36 executes the pen detection process.

(SP40)

The detection circuit 36 detects the detection level of the position signal in each of the sensor electrodes 18x and 18y as in the process of SP28. The process then moves to the process of SP42.

(SP42)

The detection circuit 36 determines whether or not the electronic pen 2 is detected as in the process of SP30. The process moves to the process of SP44 if the determination is affirmed, and the position detection process illustrated in FIG. 9 ends if the determination is negated.

(SP44)

The output circuit 40 outputs the information indicating the pen position and the pen data to the host processor 22 as in the process of SP32. This completes the position detection process illustrated in FIG. 9.

Effects

The touch IC 20 included in the position detection system 1 according to the first embodiment uses the touch sensor 18 of capacitance type to detect the position indicated by the electronic pen 2 as the first indicator that communicates with the touch sensor 18 to indicate the position and the position indicated by the hand or finger 4 as the second indicator that indicates the position without the communication. The touch IC 20 includes the detection circuit 30 (first detection circuit) that detects the touch of the hand or finger 4 to the input surface 3a arranged on the touch sensor 18, the detection circuit 36 (second detection circuit) that detects the electronic pen 2 when the proximity information of the electronic pen 2 with respect to the touch sensor 18 is equal to or greater than the pen detection threshold, and the changing circuit 42 that changes the pen detection threshold to a large value in a case where the detection circuit 30 detects the touch of the hand or finger 4 compared to a case where the detection circuit 30 does not detect the touch.

The first embodiment provides the position detection method of using the touch sensor 18 to detect the position indicated by the electronic pen 2 and the position indicated by the hand or finger 4, the position detection method being executed by the touch IC 20. The position detection method includes the first detection (SP22) of detecting the touch of the hand or finger 4 of the user to the input surface 3a, the second detection (SP30) of detecting the electronic pen 2 when the proximity information of the electronic pen 2 with respect to the touch sensor 18 is equal to or greater than the threshold, and the changing (SP24) of changing the pen detection threshold to a large value in the case where the touch is detected in the first detection compared to the case where the touch is not detected.

According to the position detection system 1, the touch IC 20, and the position detection method of the first embodiment, the pen detection threshold is changed to a large value when the touch of the hand or finger 4 of the user is detected. This reduces the detection sensitivity of the electronic pen 2 as described above with reference to FIGS. 5A and 5B, and the detection of the electronic pen 2 becomes more difficult than before the change in the pen detection threshold. This can prevent the touch position T or the like of the side part 5 as illustrated in FIG. 4 from being falsely detected as the pen position.

When the exclusive mode is used in the conventional technique, there is an inconvenience that the exclusive mode is not cancelled unless the pen tip of the electronic pen 2 is separated to some extent from the input surface 3a and the touch cannot be detected. According to the present embodiment, the pen detection sensitivity is reduced, so that the electronic pen 2 becomes undetected immediately after the pen-up in the exclusive mode, and the exclusive mode is cancelled. This can relieve the inconvenience that the touch cannot be detected even when the pen tip of the electronic pen 2 is very close to the input surface 3a because the exclusive mode is used. For example, when the user holds the electronic pen 2 with one hand to make an input and performs the pinch-out operation with the other hand after separating the pen tip from the input surface 3a, the pinch-out operation can appropriately be detected even if the pen tip is very close to the input surface 3a. This can improve the usability of the user.

The scan rate ratio of the pen detection to the touch detection in the time-series mode (the ratio of the scan execution frequency of the pen detection to the scan execution frequency of the touch detection) is usually set to a predetermined ratio. The position detection system 1 can reduce the pen detection sensitivity regardless of the standard of the electronic pen 2, and hence, the position detection system 1 can change the scan rate ratio in such a manner as to set a high scan rate for the touch detection regardless of the standard of the electronic pen 2.

In the position detection system 1, the proximity information is the reception strength in the touch sensor 18 of the downlink signal DS transmitted from the electronic pen 2.

According to the configuration, the pen detection threshold can be increased by the threshold of the reception strength in the touch sensor 18 of the downlink signal DS for detecting the electronic pen 2 being increased, and the detection sensitivity of the electronic pen 2 can appropriately be reduced.

In the position detection system 1, the proximity information may be the amount of change in the capacitance generated by the capacitive coupling of the electronic pen 2 and the touch sensor 18.

According to the configuration, the pen detection threshold can be increased by the threshold of the amount of change in the capacitance for detecting the electronic pen 2 being increased, and the detection sensitivity of the electronic pen 2 can appropriately be reduced.

In the position detection system 1, the changing circuit 42 changes the pen detection threshold according to the distances d1 and d2 between the input surface 3a and the touch sensor 18.

If the distances d1 and d2 from the input surface 3a to the touch sensor 18 are different, the reachability of the downlink signal DS varies even when the height of the electronic pen 2 with respect to the input surface 3a is the same. Even when the reachability of the downlink signal DS varies in this way, the present configuration can change the pen detection threshold according to the distances d1 and d2, and the electronic pen 2 can be detected at, for example, the same short distance D as described above with reference to FIGS. 6A and 6B. This can suppress the difference in the usability of the user based on the difference in the specifications of the touch ICs 20, such as different distances d1 and d2 from the input surface 3a to the touch sensor 18.

Second Embodiment

The position detection system according to a second embodiment of the present disclosure will next be described with reference to FIGS. 10 and 11. In the position detection system according to the second embodiment, the pen detection threshold is changed to a large value when the touch of the hand or finger 4 of the user is detected as in the first embodiment. The same reference signs are provided to the components and functions similar to those of the first embodiment, and the description will appropriately be skipped. Differences from the first embodiment will be described.

Figure 10:
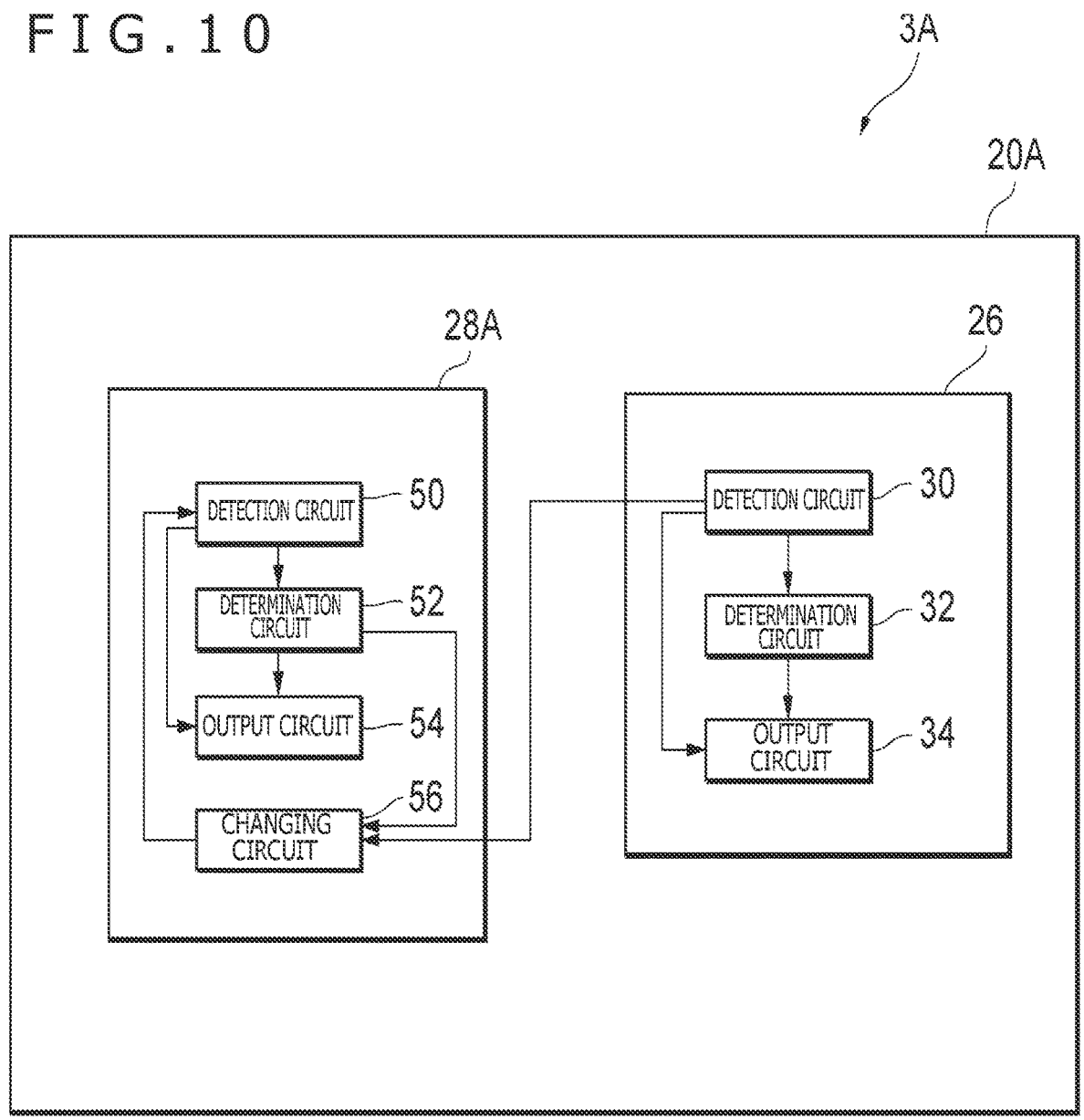
FIG. 10 is a block diagram illustrating functional components included in the touch IC according to a second embodiment.

FIG. 10 is a block diagram illustrating functional components included in a touch IC 20A according to the second embodiment. As illustrated in FIG. 10, the position detection system according to the second embodiment includes an electronic device 3A in place of the electronic device 3 according to the first embodiment. The electronic device 3A is a tablet terminal similar to the electronic device 3, and the electronic device 3A includes the touch IC 20A in place of the touch IC 20 according to the first embodiment.

The touch IC 20A includes the touch detection circuit 26 and a pen detection circuit 28A. The touch detection circuit 26 is similar to that of the first embodiment, and the description will not be repeated. The pen detection circuit 28A includes a detection circuit 50, a determination circuit 52, an output circuit 54, and a changing circuit 56. The detection circuit 50, the determination circuit 52, the output circuit 54, and the changing circuit 56 have functions similar to those of the detection circuit 36, the determination circuit 38, the output circuit 40, and the changing circuit 42, respectively, and further have functions described below.

The detection circuit 50 acquires information indicating the use state of the detected electronic pen 2 and outputs the information to the determination circuit 52. Examples of the information indicating the use state of the electronic pen 2 include pen storage information, pen tilt information, and pen speed information. The pen storage information is information indicating that the electronic pen 2 is stored in the electronic device 3A. The pen tilt information is information representing the pen tilt of the electronic pen 2 indicating the angle between the normal of the input surface 3a and the axis of the electronic pen 2. The pen speed information is information indicating the speed or the acceleration of the movement of the electronic pen 2 on the input surface 3a.

The pen storage information can be acquired by, for example, using a sensor or the like to detect the storage of the electronic pen 2 in the electronic device 3A and receiving the detected information from the host processor 22. The pen tilt information can be acquired by, for example, acquiring two sets of pen coordinates according to the downlink signals transmitted from two transmission electrodes of the electronic pen 2 corresponding to tilt detection and then calculating the pen tilt in reference to the distance between the sets of pen coordinates. The pen speed information can be acquired by, for example, calculating the pen speed in reference to the displacement of the detected pen position and the movement time of the displacement.

The determination circuit 52 determines the use state of the electronic pen 2 in reference to the information indicating the use state of the electronic pen 2 detected by the detection circuit 50. Specifically, the determination circuit 52 determines whether or not the electronic pen 2 is in use in reference to the information indicating the use state of the electronic pen 2 detected by the detection circuit 50. For example, the determination circuit 52 determines whether or not the electronic pen 2 is in use according to whether or not conditions related to the pen storage information, the pen tilt information, and the pen speed information are satisfied. The determination circuit 52 determines that the electronic pen 2 is in use when, for example, the electronic pen 2 is not stored in the electronic device 3A, the electronic pen 2 is not too tilted horizontally, and the speed or the acceleration of the electronic pen 2 is equal to or greater than a threshold to assume that the electronic pen 2 is in use. Note that not all of the conditions related to the pen storage information, the pen tilt information, and the pen speed information have to be satisfied in the determination, and the determination circuit 52 may determine that the electronic pen 2 is in use when at least one of the conditions is satisfied. The determination circuit 52 outputs the determination result to the output circuit 54 and the changing circuit 56.

The determination circuit 52 also determines whether or not the pen position detected by the detection circuit 50 is out of a predetermined range including the touch position detected by the detection circuit 30. The predetermined range including the touch position is, for example, a region that has a substantially circular shape formed by a contour line at a predetermined distance (for example, approximately 1 cm) from the touch position and that can be assumed to coincide with the touch position (hereinafter, referred to as a "neighborhood region of touch position"). The determination circuit 52 determines whether or not the pen position is out of the neighborhood region of the touch position in reference to the pen coordinates calculated by the detection circuit 50 and the touch coordinates calculated by the detection circuit 30. The determination circuit 52 outputs the determination result to the output circuit 54 and the changing circuit 56.

The output circuit 54 outputs the pen position to the host processor 22 according to the result of determination made by the determination circuit 52. For example, the output circuit 54 outputs the pen position to the host processor 22 when the determination circuit 52 determines that the electronic pen 2 is in use and that the pen position is out of the neighborhood region of the touch position. On the other hand, the output circuit 54 does not output the pen position or outputs the pen position after invalidating the pen position when the determination circuit 52 determines that the electronic pen 2 is not in use or the pen position is in the neighborhood region of the touch position. Output of the pen position after invalidating the pen position means that the pen position is output to the host processor 22 after being invalidated to prevent the host processor 22 from drawing a picture or the like based on the pen position, as in the case of the output of the touch position after invalidating the touch position.

The changing circuit 56 does not change the pen detection threshold or turns the changed pen detection threshold back into the direction of the pre-change value when predetermined conditions are satisfied. The predetermined conditions are conditions indicating that it is likely that the downlink signal DS (position signal) received by the sensor electrodes 18x and 18y is a position signal indicating the true pen position directly received from the pen electrodes of the electronic pen 2 and not a position signal indicating a fake pen position.

Not changing the pen detection threshold means that the set pen detection threshold is maintained and not changed even when the detection circuit 30 detects the touch. Turning the changed pen detection threshold back into the direction of the pre-change value means that the pen detection threshold changed when the detection circuit 30 detects the touch is turned back into the value set before the detection of the touch. That is, the changing circuit 56 reduces the pen detection sensitivity only when the true pen position is not detected and does not reduce the pen detection sensitivity when the true pen position is detected. This can prevent the true pen position from becoming difficult to detect.

An example of the predetermined conditions is that the detection circuit 50 has detected the electronic pen 2. It is likely that the downlink signal DS received by the sensor electrodes 18x and 18y is a position signal directly received from the pen electrodes of the electronic pen 2 without going through the path P, when the detection circuit 50 detects the electronic pen 2. Hence, the changing circuit 56 does not reduce the pen detection sensitivity in this case.

Another example of the predetermined conditions is that the electronic pen 2 detected by the detection circuit 50 is in use. It is more likely that the downlink signal DS received by the sensor electrodes 18x and 18y is a position signal directly received from the pen electrodes of the electronic pen 2 without going through the path P, when the electronic pen 2 is in use. Hence, the changing circuit 56 does not reduce the pen detection sensitivity when the determination circuit 52 determines that the electronic pen 2 is in use.

One of the predetermined conditions is that the pen position detected by the detection circuit 50 is out of the predetermined range including the touch position detected by the detection circuit 30, that is, out of the neighborhood region of the touch position. When the pen position is outside the neighborhood region of the touch position, it cannot be assumed that the touch position and the pen position coincide with each other, and it is more likely that the downlink signal DS received by the sensor electrodes 18x and 18y is a position signal directly received from the pen electrodes without going through the path P. Hence, the changing circuit 56 does not reduce the pen detection sensitivity when the determination circuit 52 determines that the pen position is out of the neighborhood region of the touch position.

Figure 11:
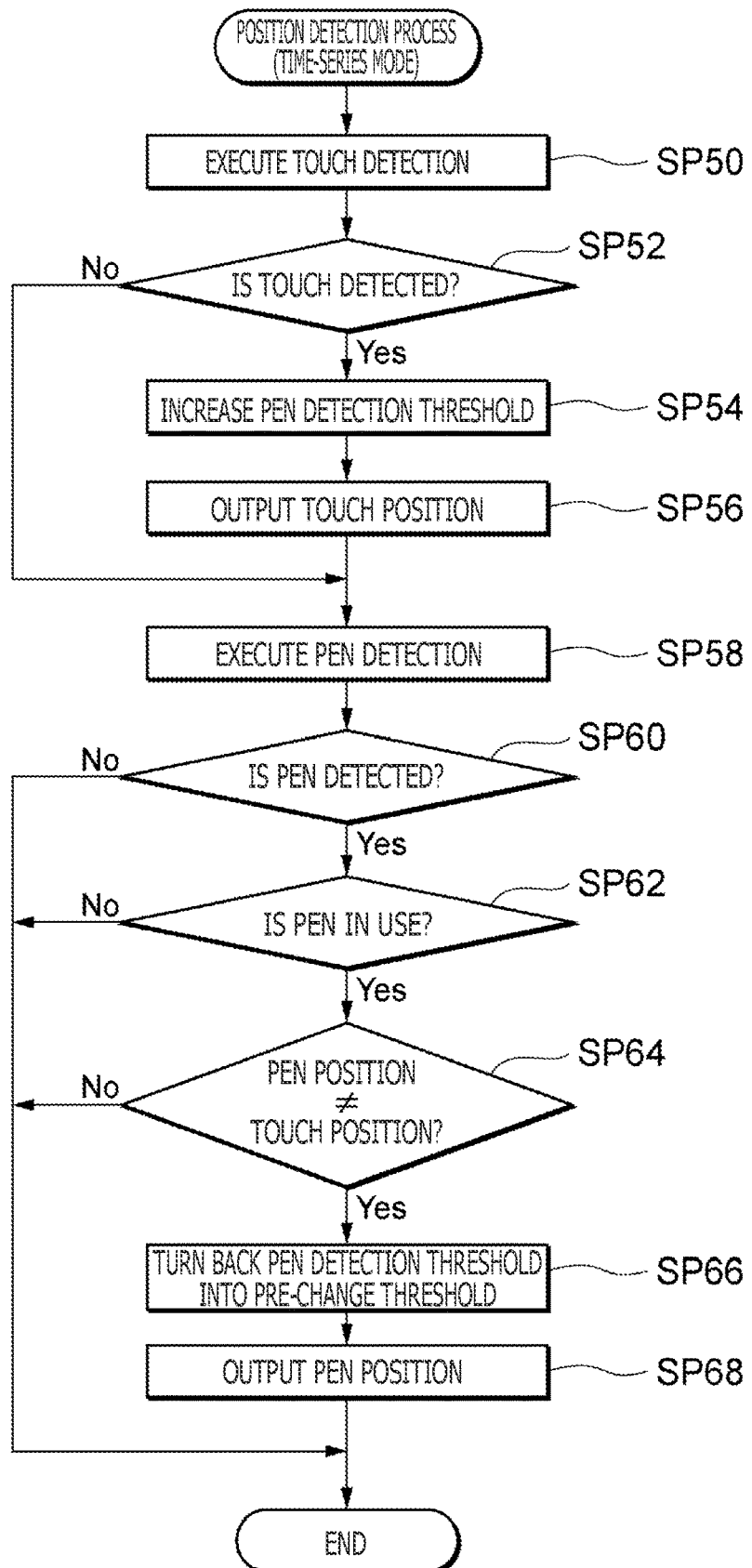
FIG. 11 is a flow chart illustrating an example of the flow of the position detection process in the time-series mode according to the second embodiment.

FIG. 11 is a flow chart illustrating an example of the flow of the position detection process in the time-series mode according to the second embodiment. The process of SP50 to SP60 illustrated in FIG. 11 is similar to the process of SP20 to SP30 illustrated in FIG. 8, and the description will not be repeated. The process from SP62 will be described.

(SP62)

The detection circuit 50 acquires the information indicating the use state of the electronic pen 2 detected in the process of SP60. The determination circuit 52 determines whether or not the electronic pen 2 is in use in reference to the information. The determination circuit 52 determines whether or not the electronic pen 2 is in use according to, for example, whether or not the electronic pen 2 is not too tilted horizontally in reference to the pen tilt information such that the electronic pen 2 is inclined to the extent that allows the electronic pen 2 to be assumed to be in use. If the electronic pen 2 is too tilted horizontally, the determination circuit 52 negates the determination, and the position detection process illustrated in FIG. 11 ends. On the other hand, if the electronic pen 2 is inclined to the extent that allows the electronic pen 2 to be assumed to be in use, the determination circuit 52 affirms the determination, and the process moves to the process of SP64.

(S64)

The determination circuit 52 determines whether or not the pen position of the electronic pen 2 detected in the process of SP60 does not coincide with the touch position of the hand or finger 4 detected in the process of SP52. The detection circuit 50 detects, for example, the center position of the pen region detected in the process of SP60, as the pen position. The determination circuit 52 makes the determination according to whether or not the pen position is positioned outside the neighborhood region of the touch position detected in the process of SP56. If the pen position is positioned in the neighborhood region of the touch position, the determination circuit 52 negates the determination, and the position detection process illustrated in FIG. 11 ends. On the other hand, if the pen position is positioned outside the neighborhood region of the touch position, the determination circuit 52 affirms the determination, and the process moves to the process of SP66.

(SP66)

The changing circuit 56 turns the pen detection threshold changed in the process of SP54 back to the pre-change pen detection threshold. The process then moves to the process of SP68.

(SP68)

The detection circuit 50 calculates the pen coordinates of the pen position detected in the process of SP64. The detection circuit 50 decodes the data signal to acquire the pen data when the downlink signal DS includes the data signal. The output circuit 54 outputs the information indicating the pen coordinates and the pen data to the host processor 22. This completes the position detection process illustrated in FIG. 11.

Effects

In the position detection system according to the second embodiment, the pen detection threshold is changed to a large value when the touch of the hand or finger 4 of the user is detected, as in the position detection system 1 according to the first embodiment. This can suppress the false detection of the touch position T as the pen position, as in the first embodiment.

According to the second embodiment, the pen detection threshold is not changed or the changed pen detection threshold is turned back into the direction of the pre-change value when the predetermined conditions are satisfied. According to the configuration, the pen position can appropriately be detected when the true pen position is likely to be detected instead of the touch position T being falsely detected (false pen position).

One of the predetermined conditions is that the electronic pen 2 is detected. When the electronic pen 2 is detected, it is likely that the true pen position is detected instead of the touch position T being falsely detected as the pen position. Hence, the pen detection sensitivity is not reduced in this case, and the true pen position can appropriately be detected.

One of the predetermined conditions is that the detected electronic pen 2 is in use. When the detected electronic pen 2 is in use, it is more likely that the true pen position is detected instead of the false detection of the touch position T as the pen position. Hence, the pen detection sensitivity is not reduced in such a case, and the true pen position can be appropriately detected.

One of the predetermined conditions is that the detected pen position is out of the neighborhood region of the touch position. It is more likely that the detected pen position is the true pen position when the detected pen position is out of the neighborhood region of the touch position T and the detected pen position cannot be assumed to coincide with the touch position T. Hence, the pen detection sensitivity is not reduced in such a case, and the true pen position can appropriately be detected.

Third Embodiment

The position detection system according to a third embodiment of the present disclosure will be described with reference to FIGS. 12 to 14. In the position detection system according to the third embodiment, the pen detection threshold is changed to a large value when the touch of the hand or finger 4 of the user is detected, as in the first embodiment. The same reference signs are provided to the components and functions similar to those of the first embodiment, and the description will appropriately be skipped. Differences from the first embodiment will be described.

Figure 12:
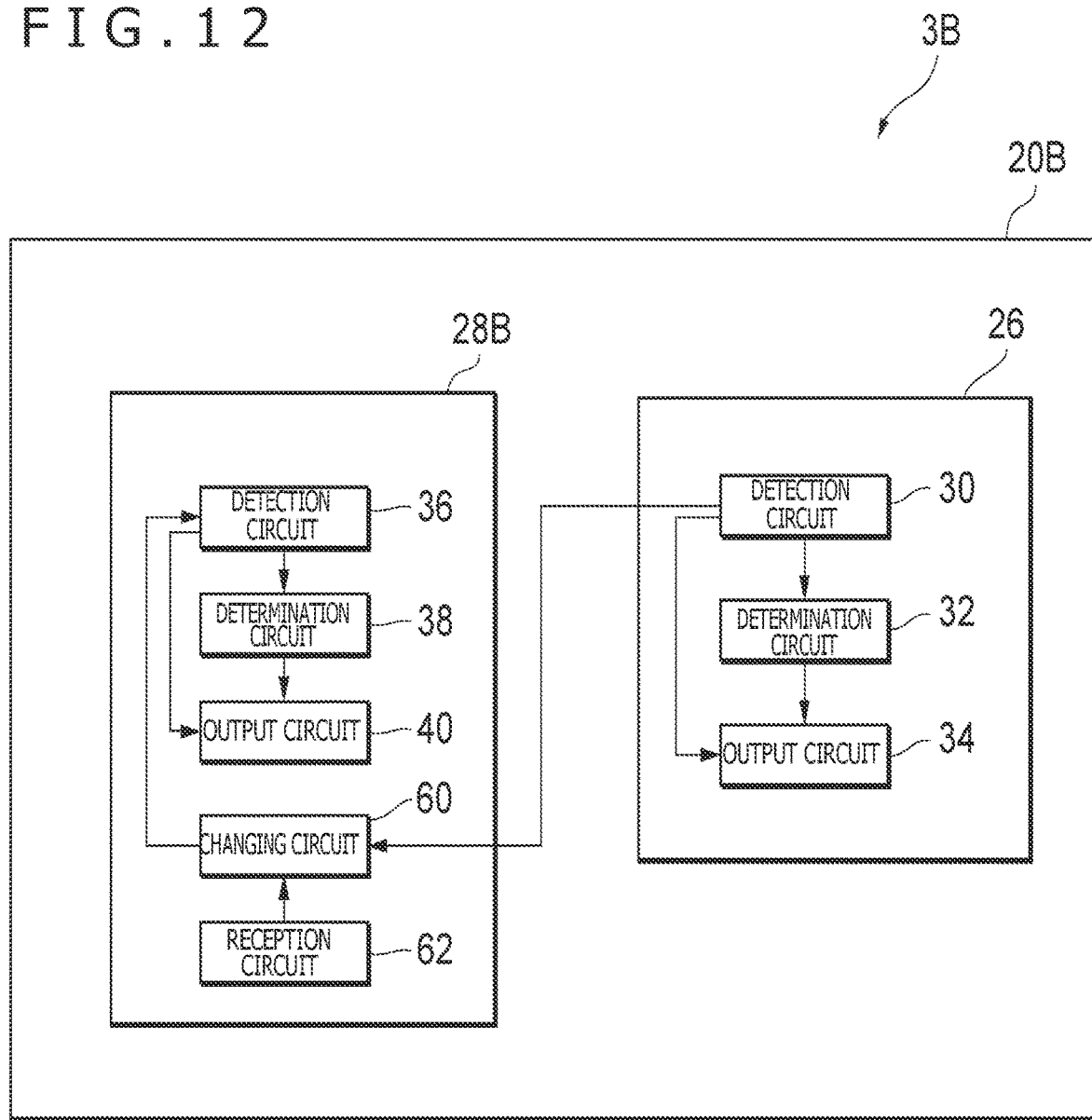
FIG. 12 is a block diagram illustrating functional components included in the touch IC according to a third embodiment.

FIG. 12 is a block diagram illustrating functional components included in a touch IC 20B according to the third embodiment. As illustrated in FIG. 12, the position detection system according to the third embodiment includes an electronic device 3B in place of the electronic device 3 according to the first embodiment. The electronic device 3B is a tablet terminal similar to the electronic device 3, and the electronic device 3B includes the touch IC 20B in place of the touch IC 20 according to the first embodiment.

The touch IC 20B includes the touch detection circuit 26 and a pen detection circuit 28B. The touch detection circuit 26 is similar to that of the first embodiment, and the description will not be repeated. The pen detection circuit 28B includes the detection circuit 36, the determination circuit 38, and the output circuit 40 just like the pen detection circuit 28 and further includes a changing circuit 60 and a reception circuit 62 in place of the changing circuit 42. The detection circuit 36, the determination circuit 38, and the output circuit 40 are similar to those of the first embodiment, and the description will not be repeated.

The changing circuit 60 has a function similar to that of the changing circuit 42 according to the first embodiment and changes the pen detection threshold to a large value when the detection circuit 30 detects the touch of the hand or finger 4 to the input surface 3a. The changing circuit 60 further changes the pen detection threshold according to a hover height designated by the user (hereinafter, referred to as a "designated hover height") when the reception circuit 62 receives the designation of the hover height. Specifically, the changing circuit 60 changes the pen detection threshold such that the electronic pen 2 is detected when the distance L between the electronic pen 2 and the touch sensor 18 is equal to or smaller than the designated hover height.

The reception circuit 62 receives the designation of the hover height according to the input of the user.

Figure 13:
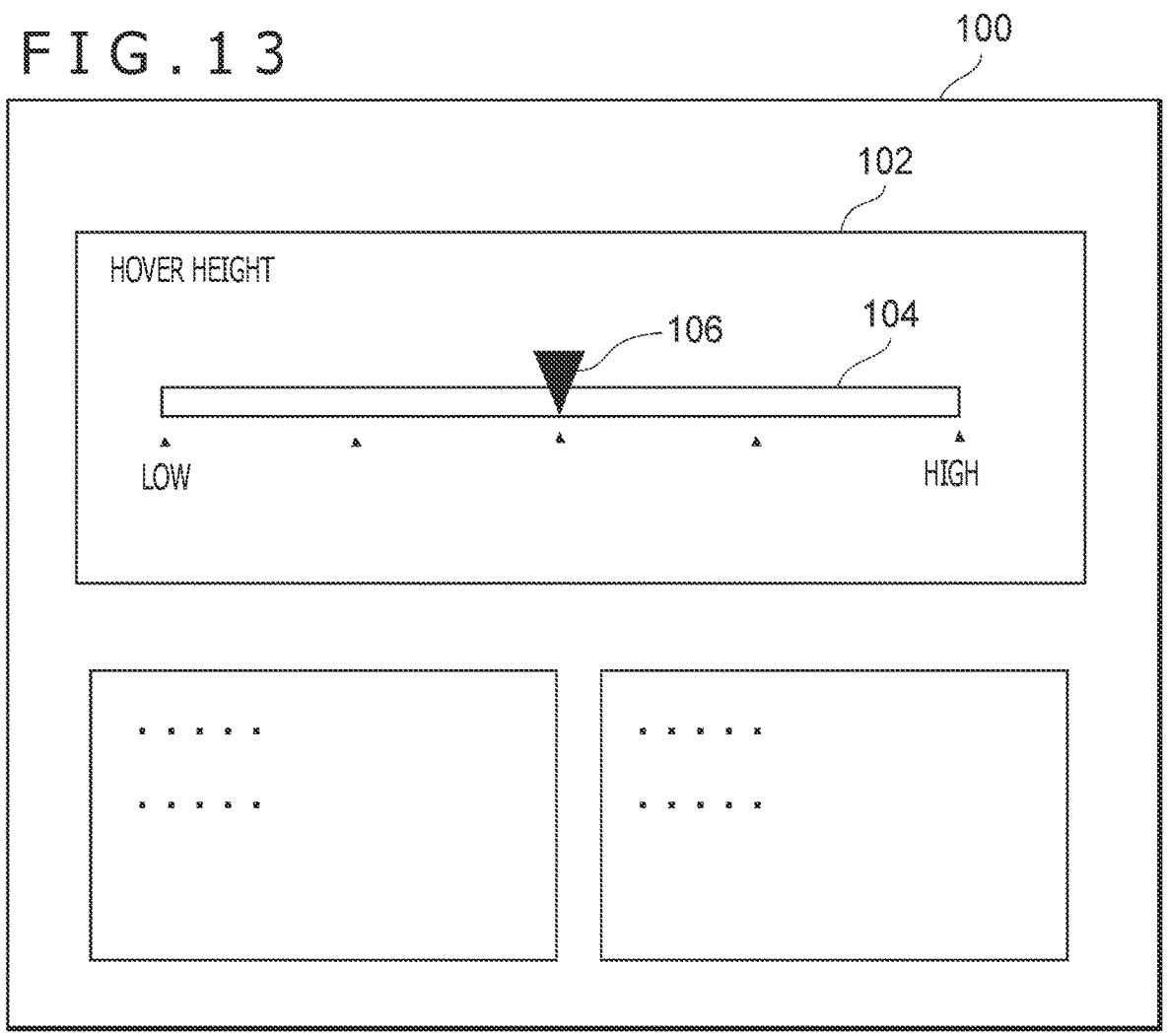
FIG. 13 depicts an example of an input screen for receiving an input of the hover height from the user.

FIG. 13 depicts an example of an input screen for receiving the input of the hover height from the user. An input screen 100 illustrated in FIG. 13 is displayed as a setting screen of the electronic pen 2 on various applications such as drawing software of the host processor 22. The input screen 100 includes a hover height input circuit 102 and various other setting information input circuits of the electronic pen 2. The hover height input circuit 102 includes, for example, a level bar 104 indicating levels of the hover height in stages and a slider 106 for designating the level of the hover height. The user can move the slider 106 on the level bar 104 through the touch of the finger 4 or the electronic pen 2 in the input screen 100 and press a confirmation button or the like to designate the hover height. Note that the user may be able to directly input a value or the like indicating the hover height to designate the hover height.

Figure 14:
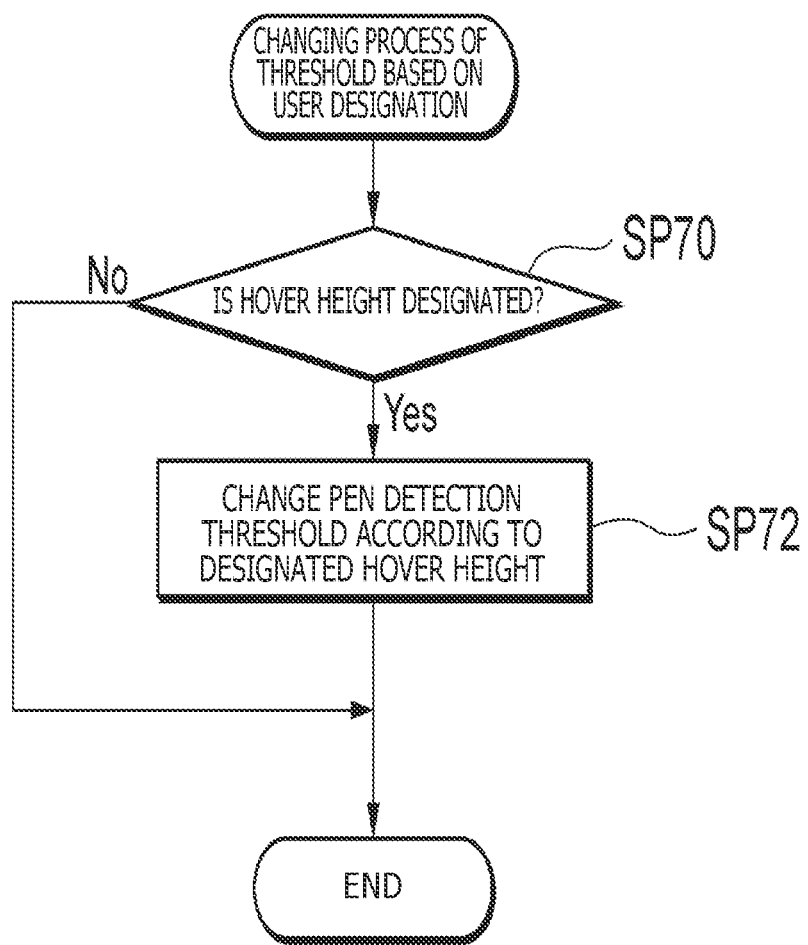
FIG. 14 is a flow chart illustrating an example of a flow of a changing process of the pen detection threshold according to the designated hover height.

FIG. 14 is a flow chart illustrating an example of the flow of the changing process of the pen detection threshold according to the designated hover height. The changing process illustrated in FIG. 14 is started when, for example, the host processor 22 displays the input screen 100 on an application such as drawing software.
(SP70)

The reception circuit 62 determines whether or not the designation of the hover height is received. The reception circuit 62 makes the determination according to whether or not there is an input operation for the hover height in the input screen 100 (for example, an operation performed by the user moving the slider 106 on the level bar 104 and pressing the confirmation button). If there is an input operation for the hover height, the reception circuit 62 affirms the determination, and the process moves to the process of SP72. On the other hand, if there is no input operation for the hover height, the reception circuit 62 negates the determination and ends the changing process illustrated in FIG. 14.
(SP72)

The changing circuit 60 changes the setting of the pen detection threshold from the initial value such that the electronic pen 2 is detected when the distance L between the electronic pen 2 and the touch sensor 18 is equal to or smaller than the designated hover height. This completes the changing process illustrated in FIG. 14. The series of position detection processes illustrated in FIG. 7 is started after the end of the changing process illustrated in FIG. 14.

Note that the changing process illustrated in FIG. 14 may be executed at any timing in the process illustrated in FIG. 7. In this case, whether to preferentially change the pen detection threshold according to the designated hover height or to preferentially change the pen detection threshold according to the touch detection may appropriately be changed in the setting. For example, in the case of preferentially changing the pen detection threshold according to the touch detection, the pen detection threshold may be changed to a value larger than the pen detection threshold changed according to the designated hover height (or the initial set value) in response to the detection of the touch in the position detection process at SP14 of FIG. 7. For example, in the case of preferentially changing the pen detection threshold according to the designated hover height, the pen detection threshold may not be changed even when the touch is detected in the position detection process at SP14 of FIG. 7, and the pen detection threshold changed according to the designated hover height may be maintained.
Effects In the position detection system according to the third embodiment, the pen detection threshold is also changed to a large value when the touch of the hand or finger 4 of the user is detected, as in the position detection system 1 according to the first embodiment. This can suppress the false detection of the touch position T as the pen position, as in the first embodiment.

According to the third embodiment, the pen detection threshold is changed such that the electronic pen 2 is detected when the distance L between the electronic pen 2 and the touch sensor 18 is equal to or smaller than the designated hover height received from the user in the reception (SP70). Hence, the user can designate the desirable hover height to change the detection sensitivity of the electronic pen 2, and the usability can be improved.
Modifications The present disclosure is not limited to the embodiments. That is, those skilled in the art can appropriately change the design of the embodiments, and the changed embodiments are also included in the scope of the present disclosure as long as the changed embodiments have the features of the present disclosure. In addition, the elements included in the embodiments and modifications described later can be combined if technically possible, and the combinations are also included in the scope of the present disclosure as long as the combinations have the features of the present disclosure.

For example, although the operation mode is switched to the exclusive mode when the electronic pen 2 is detected in the example described in the embodiments, the configuration is not limited to this. For example, when the touch operation by the hand or finger 4 of the user is continuing, the operation in the time-series mode may be continued without the operation mode being switched to the exclusive mode even if the electronic pen 2 is detected. Only the operation in the time-series mode may be performed with the exclusive mode not being used.

Even when the touch is detected in the process of SP52 in the flow chart illustrated in FIG. 11, the pen detection threshold may not be changed to a large value to reduce the pen detection sensitivity in the following process of SP54 if, for example, the electronic pen 2 is already detected in the process of the pen detection of the last time and the predetermined conditions are determined to be satisfied. That is, the pen detection threshold may be changed to a large value only if the touch is detected while the electronic pen 2 is not detected, and the pen detection threshold may not be changed even if the touch is detected while the electronic pen 2 is detected.

Although the proximity information of the electronic pen 2 is the reception strength in the touch sensor 18 of the downlink signal DS transmitted from the electronic pen 2 in the case described in the embodiments, the configuration is not limited to this. For example, the proximity information of the electronic pen 2 may be the amount of change in the capacitance generated by the capacitive coupling of the electronic pen 2 and the touch sensor 18 in addition to or in place of the reception strength of the downlink signal DS in the sensor electrodes 18x and 18y. In this case, for example, the detection circuit 36 detects the electronic pen 2 when the amount of change in the capacitance is equal to or greater than a threshold but does not detect the electronic pen 2 when the amount of change in the capacitance is smaller than the threshold. The pen detection threshold changed by the changing circuit 42 is the threshold of the amount of change in the capacitance.

The change in the pen detection threshold as described in the embodiments may be performed not only in the electronic pen 2 of active capacitance type, but also in an electronic pen of electromagnetic resonance type (EMR).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit that is connected to a capacitive sensor to detect a position of a stylus that communicates with a touch sensor and a position of a touch, the integrated circuit comprising:
at least one processor; and
at least one memory storing firmware that, when executed by the at least one processor, causes the integrated circuit to:
    detect a touch to an input surface arranged on the capacitive sensor; and
    detect the stylus based on proximity information that indicates proximity of the stylus to the capacitive sensor,
wherein the integrated circuit, in operation, detects the stylus if the proximity information is greater than or equal to a threshold; and
wherein the integrated circuit, in operation, changes the threshold based on a detection result of the touch.

2. The integrated circuit according to claim 1, wherein:
the integrated circuit, in operation, changes the threshold to a larger value when the integrated circuit detects the touch, and
the larger value is larger than a value of the threshold when the integrated circuit does not detect the touch.

3. The integrated circuit according to claim 1, wherein:
the proximity information is a reception strength at the touch sensor of a downlink signal transmitted from the stylus.

4. The integrated circuit according to claim 1, wherein:
the proximity information is an amount of change in capacitance generated by capacitive coupling of the stylus and the touch sensor.

5. The integrated circuit according to claim 1, wherein:
the integrated circuit, in operation, changes the threshold according to a distance between the input surface and the touch sensor.

6. The integrated circuit according to claim 1, wherein:
the integrated circuit, in operation, does not change the threshold or changes the threshold in a direction of a pre-change value when predetermined conditions are satisfied.

7. The integrated circuit according to claim 1, wherein the firmware, when executed by the at least one processor, causes the integrated circuit to:
receive a designation of a detectable range on the touch sensor in which the stylus not in contact with the input surface is able to be detected according to a user input, and
change the threshold such that the stylus is detected when a distance between the stylus and the touch sensor is within the detectable range.

8. A position detection system, comprising:
a stylus that communicates with a touch sensor; and
an integrated circuit that is connected to a capacitive sensor to detect a position of the stylus and a position of a touch, wherein the integrated circuit includes:
    at least one processor; and
    at least one memory storing firmware that, when executed by the at least one processor, causes the integrated circuit to:
        detect a touch to an input surface arranged on a capacitive sensor;
        detect the stylus based on proximity information that indicates proximity of the stylus to the touch sensor,
wherein the integrated circuit, in operation, detects the stylus if the proximity information is greater than or equal to a threshold; and
wherein the integrated circuit, in operation, changes the threshold based on a detection result of the integrated circuit.

9. The position detection system according to claim 8, wherein:
the integrated circuit, in operation, changes the threshold to a larger value when the integrated circuit detects the touch, and
the larger value is larger than a value of the threshold when the integrated circuit does not detect the touch.

10. The position detection system according to claim 8, wherein:
the proximity information is a reception strength at the touch sensor of a downlink signal transmitted from the stylus.

11. The position detection system according to claim 8, wherein:
the proximity information is an amount of change in capacitance generated by capacitive coupling of the stylus and the touch sensor.

12. The position detection system according to claim 8, wherein:
the integrated circuit, in operation, changes the threshold according to a distance between the input surface and the touch sensor.

13. The position detection system according to claim 8, wherein:
the integrated circuit, in operation, does not change the threshold or changes the threshold in a direction of a pre-change value when predetermined conditions are satisfied.

14. The position detection system according to claim 8, wherein the firmware, when executed by the at least one processor, causes the integrated circuit to:
receive a designation of a detectable range on the touch sensor in which the stylus not in contact with the input surface is able to be detected according to a user input, and
change the threshold such that the stylus is detected when a distance between the stylus and the touch sensor is within the detectable range.

\* \* \* \* \*